US011196091B2

(12) United States Patent
Bradwell et al.

(10) Patent No.: US 11,196,091 B2
(45) Date of Patent: *Dec. 7, 2021

(54) ELECTROCHEMICAL ENERGY STORAGE DEVICES

(71) Applicant: Ambri Inc., Marlborough, MA (US)

(72) Inventors: David J. Bradwell, Arlington, MA (US); Hari Nayar, Woburn, MA (US); Alex Vai, Sudbury, MA (US); Tom Kinney, Boston, MA (US); Sean Theriault, Boston, MA (US); Garrett Lau, Cambridge, MA (US)

(73) Assignee: AMBRI INC., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,020

(22) Filed: Dec. 17, 2019

(65) Prior Publication Data

US 2020/0287247 A1    Sep. 10, 2020

Related U.S. Application Data

(63) Continuation of application No. 15/647,468, filed on Jul. 12, 2017, now Pat. No. 10,541,451, which is a
(Continued)

(51) Int. Cl.
*H01M 10/39* (2006.01)
*H01M 4/38* (2006.01)
(Continued)

(52) U.S. Cl.
CPC ......... *H01M 10/399* (2013.01); *B60L 50/64* (2019.02); *B60L 53/00* (2019.02); *B60L 53/53* (2019.02);
(Continued)

(58) Field of Classification Search
None
See application file for complete search history.

(56) References Cited

U.S. PATENT DOCUMENTS 11,374 A     7/1854  Leue
2,587,443 A  2/1952  Crabtree
(Continued)

FOREIGN PATENT DOCUMENTS

AU    2014229643 A1    9/2015
AU    2016225020 A1    9/2017
(Continued)

OTHER PUBLICATIONS

Advisory Action Before Filing of Appeal Brief dated May 10, 2012 for U.S. Appl. No. 12/839,130.
(Continued)

*Primary Examiner* — Christopher P Domone
(74) *Attorney, Agent, or Firm* — Wilson Sonsini Goodrich & Rosati

(57) ABSTRACT

Provided herein are energy storage devices. In some cases, the energy storage devices are capable of being transported on a vehicle and storing a large amount of energy. An energy storage device is provided comprising at least one liquid metal electrode, an energy storage capacity of at least about 1 MWh and a response time less than or equal to about 100 milliseconds (ms).

17 Claims, 13 Drawing Sheets

Related U.S. Application Data continuation-in-part of application No. 14/688,179, filed on Apr. 16, 2015, now Pat. No. 9,735,450, and a continuation-in-part of application No. 14/536,563, filed on Nov. 7, 2014, now Pat. No. 9,728,814, which is a continuation of application No. 14/178,806, filed on Feb. 12, 2014, now Pat. No. 9,520,618, said application No. PCT/US2013/065092 is a continuation-in-part of application No. 13/801,333, filed on Mar. 13, 2013, now Pat. No. 9,312,522.

(60) Provisional application No. 61/715,821, filed on Oct. 18, 2012, provisional application No. 61/763,925, filed on Feb. 12, 2013, provisional application No. 61/715,821, filed on Oct. 18, 2012.

(51) Int. Cl.

| | |
|---|---|
| *H01M 4/134* | (2010.01) |
| *H01M 2/18* | (2006.01) |
| *H01M 10/42* | (2006.01) |
| *B60L 53/00* | (2019.01) |
| *B60L 50/64* | (2019.01) |
| *B60L 53/53* | (2019.01) |
| *H01M 50/463* | (2021.01) |
| *H01M 50/138* | (2021.01) |

(52) U.S. Cl.
CPC ............ *H01M 4/134* (2013.01); *H01M 4/38* (2013.01); *H01M 4/381* (2013.01); *H01M 4/382* (2013.01); *H01M 10/425* (2013.01); *H01M 10/4207* (2013.01); *H01M 50/463* (2021.01); *H01M 4/387* (2013.01); *H01M 50/138* (2021.01); *H01M 2220/20* (2013.01); *Y02T 10/70* (2013.01); *Y02T 10/7072* (2013.01); *Y02T 90/14* (2013.01)

(56) References Cited

U.S. PATENT DOCUMENTS

| | | |
|---|---|---|
| 3,057,946 A | 10/1962 | Eidensohn |
| 3,238,437 A | 3/1966 | Foster et al. |
| 3,245,836 A | 4/1966 | Agruss |
| 3,404,035 A | 10/1968 | Kummer et al. |
| 3,419,432 A | 12/1968 | Hesson |
| 3,488,221 A | 1/1970 | Hiroshi et al. |
| 3,507,703 A | 4/1970 | Laszlo |
| 3,535,214 A | 10/1970 | Winand |
| 3,607,405 A | 9/1971 | Christopher |
| 3,607,407 A | 9/1971 | Adams |
| 3,635,765 A | 1/1972 | Greenberg |
| 3,663,295 A | 5/1972 | Baker |
| 3,716,409 A | 2/1973 | Cairns et al. |
| 3,770,506 A | 11/1973 | Rightmire et al. |
| 3,775,181 A | 11/1973 | Ryerson |
| 3,833,420 A | 9/1974 | Will |
| 3,833,421 A | 9/1974 | Rubischko et al. |
| 3,833,422 A | 9/1974 | Will et al. |
| 3,837,918 A | 9/1974 | Nakabayashi |
| 3,870,561 A | 3/1975 | Charbonnier et al. |
| 3,877,984 A | 4/1975 | Werth |
| 3,878,296 A | 4/1975 | Vine et al. |
| 3,884,715 A | 5/1975 | Gay et al. |
| 3,887,396 A | 6/1975 | Walsh et al. |
| 3,898,096 A | 8/1975 | Heredy et al. |
| 3,907,589 A | 9/1975 | Gay et al. |
| 3,915,742 A | 10/1975 | Battles et al. |
| 3,926,673 A | 12/1975 | Saridakis |
| 3,930,888 A | 1/1976 | Bowser et al. |
| 3,933,521 A | 1/1976 | Vissers et al. |
| 3,941,612 A | 3/1976 | Steunenberg et al. |
| 3,947,291 A | 3/1976 | Yao et al. |
| 3,954,504 A | 5/1976 | Zellhoefer |
| 3,959,012 A | 5/1976 | Liang et al. |
| 3,960,594 A | 6/1976 | Fritz et al. |
| 3,969,139 A | 7/1976 | Lai |
| 3,980,495 A | 9/1976 | Roche et al. |
| 3,988,164 A | 10/1976 | Liang et al. |
| 4,002,807 A | 1/1977 | Ludwig |
| 4,011,374 A | 3/1977 | Kaun |
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew et al. |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Voinov |
| 4,216,273 A | 8/1980 | Cadart et al. |
| 4,238,553 A | 12/1980 | Gerlach et al. |
| 4,265,984 A | 5/1981 | Kaye |
| 4,287,268 A | 9/1981 | Coetzer |
| 4,287,269 A | 9/1981 | Coetzer et al. |
| 4,299,890 A | 11/1981 | Rea et al. |
| 4,315,974 A | 2/1982 | Athearn et al. |
| 4,338,380 A | 7/1982 | Erickson et al. |
| 4,360,574 A | 11/1982 | Park |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco, III |
| H816 H | 9/1990 | Carder et al. |
| 4,954,403 A | 9/1990 | Plichta et al. |
| 4,965,146 A | 10/1990 | McCullough et al. |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,034,290 A | 7/1991 | Sands et al. |
| 5,039,351 A | 8/1991 | Cooper et al. |
| 5,044,551 A | 9/1991 | Tanaka et al. |
| 5,139,895 A | 8/1992 | Roy et al. |
| 5,185,068 A | 2/1993 | Sadoway |
| 5,198,638 A | 3/1993 | Massacesi |
| 5,254,232 A | 10/1993 | Sadoway |
| 5,284,562 A | 2/1994 | Beck et al. |
| 5,286,359 A | 2/1994 | Richards et al. |
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |
| 5,491,037 A | 2/1996 | Kawakami |

(56) References Cited

U.S. PATENT DOCUMENTS

| | | |
|---|---|---|
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | Mackenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,716,731 A | 2/1998 | Coetzer et al. |
| 5,735,933 A | 4/1998 | Yokoyama et al. |
| 5,737,181 A | 4/1998 | Evans |
| 5,763,117 A | 6/1998 | Wright et al. |
| 5,807,412 A | 9/1998 | Li et al. |
| 5,834,131 A | 11/1998 | Lutz et al. |
| 5,856,041 A | 1/1999 | Inoue et al. |
| 5,874,183 A | 2/1999 | Uematsu |
| 5,939,221 A | 8/1999 | Tsuchimoto et al. |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,531,846 B1 | 3/2003 | Smith et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,255,937 B2 | 8/2007 | Park |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,554,220 B2 | 6/2009 | Sugawara |
| 7,568,537 B2 | 8/2009 | King et al. |
| 7,578,702 B1 | 8/2009 | Tom et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,858,228 B2 | 12/2010 | Yoon |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,257,868 B2 | 9/2012 | Hagiwara et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,459,314 B2 | 6/2013 | Frazier et al. |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | McBride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |
| 8,764,962 B2 | 7/2014 | Allanore et al. |
| 8,766,642 B2 | 7/2014 | Bogdan, Jr. et al. |
| 8,806,866 B2 | 8/2014 | McBride et al. |
| 8,815,445 B2 | 8/2014 | Sugiura et al. |

(56) References Cited

U.S. PATENT DOCUMENTS

| | | |
|---|---|---|
| 9,000,713 B2 | 4/2015 | Boysen et al. |
| 9,035,617 B2 | 5/2015 | Parakulam et al. |
| 9,076,996 B2 | 7/2015 | Bradwell et al. |
| 9,106,980 B2 | 8/2015 | Parakulam et al. |
| 9,153,803 B2 | 10/2015 | Chung et al. |
| 9,312,522 B2 | 4/2016 | Bradwell et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |
| 9,735,450 B2 | 8/2017 | Bradwell et al. |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,893,385 B1 | 2/2018 | Nayar et al. |
| 9,925,881 B2 | 3/2018 | Manotas et al. |
| 10,270,139 B1 | 4/2019 | Deak et al. |
| 10,297,870 B2 | 5/2019 | Bradwell |
| 10,541,451 B2 | 1/2020 | Bradwell et al. |
| 10,566,662 B1 | 2/2020 | Hari et al. |
| 10,608,212 B2 | 3/2020 | Bradwell et al. |
| 10,637,015 B2 | 4/2020 | Thompson et al. |
| 10,903,528 B2 | 1/2021 | Ouchi et al. |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0052646 A1 | 3/2003 | Minamiura et al. |
| 2003/0186111 A1 | 10/2003 | Tamakoshi |
| 2003/0196908 A1 | 10/2003 | Brown |
| 2003/0203279 A1 | 10/2003 | Tsukamoto et al. |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1* | 4/2005 | Kairawicz ......... H01M 50/1243 429/175 |
| 2005/0237029 A1 | 10/2005 | Takezawa et al. |
| 2005/0238954 A1 | 10/2005 | Kawada |
| 2006/0127735 A1 | 6/2006 | Sabin et al. |
| 2006/0151333 A1 | 7/2006 | Banek |
| 2007/0067119 A1 | 3/2007 | Loewen et al. |
| 2007/0184711 A1 | 8/2007 | Thrap et al. |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 | 2/2008 | Sadoway et al. |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2010/0291443 A1 | 11/2010 | Farmer |
| 2011/0014503 A1 | 1/2011 | Bradwell et al. |
| 2011/0014505 A1* | 1/2011 | Bradwell ............ H01M 50/148 429/51 |
| 2011/0020694 A1 | 1/2011 | Khakhalev et al. |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0144861 A1 | 6/2011 | Lakirovich et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0086128 A1 | 4/2012 | Ponoth et al. |
| 2012/0091806 A1 | 4/2012 | Tsutsumi et al. |
| 2012/0094194 A1 | 4/2012 | Visco et al. |
| 2012/0104990 A1 | 5/2012 | Boysen et al. |
| 2012/0107675 A1 | 5/2012 | Kim et al. |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0171524 A1 | 7/2012 | Hiraiwa et al. |
| 2012/0183838 A1 | 7/2012 | An et al. |
| 2012/0190252 A1 | 7/2012 | Pavlinsky et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | McBride et al. |
| 2012/0319653 A1 | 12/2012 | Kumar |
| 2012/0328910 A1 | 12/2012 | La et al. |
| 2012/0328935 A1 | 12/2012 | Matsui et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams et al. |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0073234 A1 | 3/2013 | Leport et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |
| 2013/0130085 A1 | 5/2013 | Choi |

(56) References Cited

U.S. PATENT DOCUMENTS

| | | |
|---|---|---|
| 2013/0134928 A1 | 5/2013 | Uchihashi et al. |
| 2013/0136980 A1 | 5/2013 | Bartling |
| 2013/0143139 A1 | 6/2013 | Tao et al. |
| 2013/0145764 A1 | 6/2013 | McBride et al. |
| 2013/0149567 A1 | 6/2013 | Schaefer |
| 2013/0166085 A1 | 6/2013 | Cherian et al. |
| 2013/0183544 A1 | 7/2013 | Yoshioka et al. |
| 2013/0295435 A1 | 11/2013 | Vu |
| 2013/0315659 A1 | 11/2013 | Kumar et al. |
| 2014/0000251 A1 | 1/2014 | McBride et al. |
| 2014/0038011 A1 | 2/2014 | Fukunaga et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0176147 A1 | 6/2014 | Wiegman et al. |
| 2014/0220428 A1 | 8/2014 | Zinck et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0277791 A1 | 9/2014 | Lenard et al. |
| 2014/0315097 A1 | 10/2014 | Tan et al. |
| 2014/0349159 A1 | 11/2014 | Bartling et al. |
| 2014/0365027 A1 | 12/2014 | Namba et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0093614 A1 | 4/2015 | Fukuhara et al. |
| 2015/0132627 A1 | 5/2015 | Bradwell et al. |
| 2015/0132628 A1 | 5/2015 | Bradwell et al. |
| 2015/0214579 A1 | 7/2015 | Boysen et al. |
| 2015/0249273 A1 | 9/2015 | Bradwell et al. |
| 2015/0249274 A1 | 9/2015 | Bradwell et al. |
| 2015/0280480 A1 | 10/2015 | Mitri et al. |
| 2015/0303525 A1 | 10/2015 | Bradwell et al. |
| 2015/0318586 A1 | 11/2015 | Rahmane et al. |
| 2015/0325821 A1 | 11/2015 | Bradwell et al. |
| 2015/0380713 A1 | 12/2015 | Kimura et al. |
| 2016/0006090 A1 | 1/2016 | Licht |
| 2016/0156068 A1 | 6/2016 | Burke et al. |
| 2016/0172714 A1 | 6/2016 | Ouchi et al. |
| 2016/0186235 A1 | 6/2016 | Joseph et al. |
| 2016/0190607 A1 | 6/2016 | Wyser et al. |
| 2016/0211555 A9 | 7/2016 | Bradwell et al. |
| 2016/0254512 A1 | 9/2016 | Yin et al. |
| 2016/0301038 A1 | 10/2016 | Modest et al. |
| 2016/0336623 A1 | 11/2016 | Nayar et al. |
| 2016/0344066 A1 | 11/2016 | Sudworth et al. |
| 2016/0365612 A1 | 12/2016 | Bradwell et al. |
| 2016/0372763 A1 | 12/2016 | Lu et al. |
| 2017/0018811 A1 | 1/2017 | Bradwell et al. |
| 2017/0104244 A1 | 4/2017 | Bull et al. |
| 2017/0149095 A1 | 5/2017 | Amendola et al. |
| 2017/0222273 A1 | 8/2017 | Bradwell et al. |
| 2017/0248041 A1 | 8/2017 | Lenk et al. |
| 2017/0259648 A1 | 9/2017 | Putcha et al. |
| 2017/0263951 A1 | 9/2017 | Kanno et al. |
| 2017/0309979 A1 | 10/2017 | Lee et al. |
| 2017/0338451 A9 | 11/2017 | Bradwell et al. |
| 2017/0358941 A1 | 12/2017 | Mitri et al. |
| 2018/0034110 A1 | 2/2018 | Sudworth et al. |
| 2018/0083274 A1 | 3/2018 | Martin |
| 2018/0090726 A1 | 3/2018 | Thompson et al. |
| 2018/0097259 A1 | 4/2018 | Bradwell et al. |
| 2018/0191162 A1 | 7/2018 | Hanada et al. |
| 2019/0089013 A1 | 3/2019 | Ouchi et al. |
| 2019/0115632 A1 | 4/2019 | Beuning et al. |
| 2019/0123369 A1 | 4/2019 | Ma et al. |
| 2020/0076006 A1 | 3/2020 | Bradwell et al. |
| 2020/0176824 A1 | 6/2020 | Bradwell et al. |
| 2021/0036273 A1 | 2/2021 | Thompson et al. |
| 2021/0043982 A1 | 2/2021 | Bradwell et al. |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 1578553 A | 2/2005 |
| CN | 1743056 A | 3/2006 |
| CN | 1750309 A | 3/2006 |
| CN | 101436780 A | 5/2009 |
| CN | 101506117 A | 8/2009 |
| CN | 101519313 A | 9/2009 |
| CN | 101828285 A | 9/2010 |
| CN | 101942676 A | 1/2011 |
| CN | 201809448 U | 4/2011 |
| CN | 201908137 U | 7/2011 |
| CN | 102181883 A | 9/2011 |
| CN | 202076339 U | 12/2011 |
| CN | 102498589 A | 6/2012 |
| CN | 102646808 A | 8/2012 |
| CN | 103001239 A | 3/2013 |
| CN | 202797170 U | 3/2013 |
| CN | 103137916 A | 6/2013 |
| CN | 103342556 A | 10/2013 |
| CN | 103367663 A | 10/2013 |
| CN | 104364930 A | 2/2015 |
| CN | 105190984 A | 12/2015 |
| CN | 105659415 A | 6/2016 |
| CN | 105830247 A | 8/2016 |
| DE | 3239964 A1 | 5/1984 |
| DE | 19618609 A1 | 11/1997 |
| DE | 102012103386 A1 | 10/2013 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2665120 A1 | 11/2013 |
| EP | 2709188 A1 | 3/2014 |
| GB | 2062939 A | 5/1981 |
| JP | S4933815 B1 | 9/1974 |
| JP | S5268929 A | 6/1977 |
| JP | S55053877 A1 | 4/1980 |
| JP | S61114664 A | 6/1986 |
| JP | H06223872 A | 8/1994 |
| JP | H06310171 A | 11/1994 |
| JP | H09167631 A | 6/1997 |
| JP | H1012270 A | 1/1998 |
| JP | H10208771 A | 8/1998 |
| JP | H117923 A | 1/1999 |
| JP | H11185800 A | 7/1999 |
| JP | 2001115369 A | 4/2001 |
| JP | 2001243994 A | 9/2001 |
| JP | 3355377 B2 | 12/2002 |
| JP | 2003146771 A | 5/2003 |
| JP | 2007157373 A | 6/2007 |
| JP | 2010206101 A | 9/2010 |
| JP | 2010214396 A | 9/2010 |
| JP | 2010535942 A | 11/2010 |
| JP | 2011508379 A | 3/2011 |
| JP | 2012124009 A | 6/2012 |
| JP | 2012226866 A | 11/2012 |
| JP | 2012533865 A | 12/2012 |
| JP | 2013537361 A | 9/2013 |
| JP | 2014154337 A | 8/2014 |
| JP | 2016510936 A | 4/2016 |
| JP | 2016535392 A | 11/2016 |
| KR | 20120059106 A | 6/2012 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |

(56) References Cited

FOREIGN PATENT DOCUMENTS

| | | |
|---|---|---|
| WO | WO-2008105807 A2 | 9/2008 |
| WO | WO-2008045996 A3 | 10/2008 |
| WO | WO-2008105811 A3 | 12/2008 |
| WO | WO-2009046533 A1 | 4/2009 |
| WO | WO-2009151639 A1 | 12/2009 |
| WO | WO-2010130583 A2 | 11/2010 |
| WO | WO-2011011056 A2 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |
| WO | WO-2012040176 A1 | 3/2012 |
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012144344 A1 | 10/2012 |
| WO | WO-2012145314 A2 | 10/2012 |
| WO | WO-201 2158781 A2 | 11/2012 |
| WO | WO-2012158751 A1 | 11/2012 |
| WO | WO-201 3025608 A1 | 2/2013 |
| WO | WO-201 3032667 A1 | 3/2013 |
| WO | WO-201 3048704 A1 | 4/2013 |
| WO | WO-201 3052494 A1 | 4/2013 |
| WO | WO-201 4055873 A1 | 4/2014 |
| WO | WO-201 4062702 A1 | 4/2014 |
| WO | WO-201 4062706 A1 | 4/2014 |
| WO | WO-2014140792 A2 | 9/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015066359 A1 | 5/2015 |
| WO | WO-2016138499 A1 | 9/2016 |
| WO | WO-2016141354 A2 | 9/2016 |
| WO | WO-2018/052797 | 3/2018 |
| WO | WO-2018/187777 | 11/2018 |

OTHER PUBLICATIONS

Advisory Action Before Filing of Appeal Brief dated Jun. 8, 2012 for U.S. Appl. No. 12/839,130.
Agruss. The Thermally Regenarative Liquid-Metal Cell, J. Electrochem. Soc. Nov. 1963; 110(11):1097-1103.
Allanore, A. Features and Challenges of Molten Oxide Electrolytes for Metal Extraction. Journal of The Electrochemical Society, 162 (1): E13-E22 (2015). Published Nov. 25, 2014.
Allanore, et al. A new anode material for oxygen evolution in molten oxide electrolysis. Nature, vol. 497, May 16, 2013, pp. 353-356 and Online Methods Section. Published online May 8, 2013.
ATI Technical Data Sheet, ATI 18CrCb Stainless Steel, Feb. 17, 2014.
Atthey. A Mathematical Model for Fluid Flow in a Weld Pool at High Currents. J. Fluid Mech. 1980; 98(4):787-801.
Biswas, et al. Towards Implementation of Smart Grid: An Updated Review on Electrical Energy Storage Systems. Smart Grid and Renewable Energy. 2013; 4:122-132. Published online Feb. 2013.

Bradwell, et al. Magnesium-antimony liquid metal battery for stationary energy storage. J Am Chem Soc. Feb. 1, 2012;134(4):1895-7. doi: 10.1021/ja209759s. Published on web Jan. 6, 2012.
Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.
Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.
Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.
Bradwell. Liquid metal batteries: ambipolar electrolysis and alkaline earth electroalloying cells. Thesis. Massachusetts Institute of Technology. Dept. of Materials Science and Engineering. 2011.
Bradwell. Technical and economic feasibility of a high-temperature self-assembling battery. Thesis. Department of Material Science and Engineering. MIT. 2006.
Cairns, et al. Galvanic Cells with Fused-Salt Electrolytes. AEC Research and Development. 220 pages, Nov. 1967.
Cairns, et al. High Temperature Batteries Research in high-temperature electrochemistry reveals compact, powerful energy-storage cells. Science. Jun. 20, 1969; 164(3886):1347-1355.
Cerablak™ technology. Atfi Surface Science Solutions. http://www.atfinet.com/index.php/technology. Accessed Feb. 24, 2016.
Chuang. Floating capacitor active charge balancing for PHEV application. Thesis. Ohio State University. 2010.
Co-pending U.S. Appl. No. 13/999,704, inventors David; S. Deak et al., filed on Mar. 14, 2014.
Co-pending U.S. Appl. No. 15/628,538, inventor Bradwell; David J., filed on Jun. 20, 2017.
Co-pending U.S. Appl. No. 16/740,178, inventors Nayarhari et al., filed on Jan. 10, 2020.
Co-pending U.S. Appl. No. 17/136,432, inventors Nayarhari et al., filed on Dec. 29, 2020.
Co-pending U.S. Appl. No. 17/344,527, inventors Bradwelldavid; J. et al., filed on Jun. 10, 2021.
Crowley, B. New battery could be solar power's BFF video. http://money.cnn.com/video/technology/2012/08/16/bsg-liquid-metal-battery-energy.cnnmoney. CNN Money, 2012. Accessed Jun. 29, 2015.
Cubicciotti, et al. Metal-Salt Interactions at High Temperatures: The Solubilities of Some alkaline Earth Metals in their Halides. J. Am. Chem. Soc. 1949; 71(6):2149-2153.
Davis, J.R., Effect of temperature on properties. ASM specialty handbook—Copper and copper alloys. ASM international. 2001: pp. 430-439.
Donald Sadoway: The Colbert Report video. http://thecolbertreport.cc.com/videos/8uddyg/donald-sadoway. The Colbert Report, Oct. 22, 2012. Accessed Jun. 29, 2015.
Donald Sadoway: The missing link to renewable energy Youtube Video. https://www.youtube.com/watch?v=Sddb0Khx0yA. TED, Mar. 2012. Accessed Jun. 29, 2015.
Dworkin, et al. The Electrical Conductivity of Solutions of Metals in their Molten Halides. VIII. alkaline Earth Metal Systems. J. Phys. Chem. Jul. 1966; 70(7):2384.
Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.
Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.
Energy 2064 with Professor Donald R. Sadoway Youtube Video. https://www.youtube.com/watch?v=0iwG32R2R5o. Alger, Oct. 7, 2014. Accessed Jun. 29, 2015.
EP17851347.9 Extended European Search Report dated Mar. 16, 2020.
EP18194103.0 Extended European Search Report dated Mar. 19, 2019.

(56) References Cited

OTHER PUBLICATIONS

EP18781400.9 Extended European Search Report dated Dec. 11, 2020.
"European Extended Search Report and opinion dated May 29, 2017 for EP Application No. 14857245.".
European search report and search opinion dated Feb. 12, 2014 for EP Application No. 13196841.4.
European search report and search opinion dated May 6, 2016 for EP Application No. 13847926.
European search report and search opinion dated May 13, 2016 for EP Application No. 13846301.
European supplemental search report and opinion dated Mar. 16, 2017 for EP Application No. 14853610.
Fujiwara, et al. New molten salt systems for high temperature molten salt batteries: Ternary and quaternary molten salt systems based on LiF—LiCl, LiF—LiBr, and LiCl—LiBr. Journal of Power Sources. Apr. 15, 2011; 196(8):4012-4018.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.
GE Energy Storage Durathon Battery Durathon E620 Battery Module Technical Specifications. Available at http://www.geenergystorage.com/images/ge/PDF/DurathonGridE620ModuleSpecSheet.pdf. 2012, Accessed on Oct. 18, 2012.
GE Energy Storage Durathon DC System Technical Specifications—MWh Series, 2014. Accessed Apr. 7, 2015. https://renewables.gepower.com/content/dam/gepower-renewables/global/en_US/documents/Durathon_DCMWh_Spec_Sheet_GEA-988123002A.pdf.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website, https://en.wikipedia.org/wiki/Intermetallic. Accessed Jul. 2, 2015.
International preliminary report on patentability and written opinion dated Jan. 24, 2012 for PCT Application No. US2010/002035.
International preliminary report on patentability and written opinion dated Feb. 17, 2009 for PCT Application No. US2007/018168.
International preliminary report on patentability and written opinion dated Mar. 26, 2013 for PCT Application No. US2011/052316.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
International preliminary report on patentability dated Mar. 31, 2016 for PCT Application No. PCT/US2014/056367.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
International search report and written opinion dated Jan. 22, 2015 for PCT Application No. US2014/061266.
International search report and written opinion dated Jan. 23, 2015 for PCT Application No. PCT/US2014/056367.
International search report and written opinion dated Jan. 24, 2014 for PCT/US2013/065086.
International search report and written opinion dated Jan. 27, 2014 for PCT Application No. US2013/063472.
International search report and written opinion dated Jan. 29, 2015 for PCT Application No. US2014/060979.
International search report and written opinion dated Feb. 7, 2011 for PCT/US2010/002035.
International search report and written opinion dated Jun. 1, 2016 for PCT/US2016/019970.
International search report and written opinion dated Jun. 11, 2015 for PCT Application No. IB2014/002608.
International search report and written opinion dated Sep. 7, 2016 for PCT/US2016/021048.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Jarret, et al. Advances in the Smelting of aluminum. Metallurgical Treatises, pp. 137-157, 1981.
Javadekar, et al. Energy Storage in Electrochemical Cells with Molten Sb Electrodes. Journal of The Electrochemical Society, 159 (4) A386-A389 (2012); Jan. 24, 2012 http://repository.upenn.edu/cgi/viewcontent.cgi?article=1170&context=cbe_papers.
Jungblut, et al. Diffusion of lithium in highly oriented pyrolytic graphite at low concentrations and high temperatures. Phys Rev B Condens Matter. Dec. 1, 1989;40(16):10810-10815.
Kane, et al. Electrochemical Determination of the Thermodynamic Properties of Lithium-Antimony Alloys. Journal of the Electrochemical Society, 162 (3) A421-A425 (2015). Published Dec. 31, 2014.
Kaufman, J.G., Application of aluminum alloys and tempers. Introduction to aluminum alloys and tempers—Preface. ASM International. 2000; pp. 87-118.
Kaufman, J.G., Properties and Characteristics of Aluminum and Aluminum Alloys. Fire Resistance of Aluminum and Aluminum Alloys and Measuring the Effects of Fire Exposure on the Properties of Aluminum Alloys. 2016. 9 Pages.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.
Kim, et al. Electrolysis of Molten Iron Oxide with an Iridium Anode: The Role of Electrolyte Basicity. Journal of The Electrochemical Society, 158 (10) E101-E105 (2011). Published Aug. 5, 2011.
Kim, et al. Liquid Metal Batteries: Past, Present, and Future. Chemical Reviews, vol. 113, No. 3, Mar. 13, 2013, pp. 2075-2099. Published on web Nov. 27, 2012.
Kipouros, et al. Toward new technologies for the production of Lithium. JOM, May 1998, pp. 24-26.
Lalau, et al. Sodium-bismuth-lead low temperature liquid metal battery. Journal for Electrochemistry and Plating Technology, Jun. 2015, pp. 1-7.
Lee, et al., Oxidation Behavior of Copper at a Temperature below 300° C and the Methodology for Passivation. Materials Research. 2016; 19(1): 51-56.
Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami.6b02576. Epub May 5, 2016.With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Liquid Metal Battery Research Company website, http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.

(56) References Cited

OTHER PUBLICATIONS

Magnuski, H. Innovations in Energy Storage—Professor Sadoway Video. https://vimeo.com/20906061. MIT Club of Northern California, Mar. 8, 2011. Accessed Jun. 29, 2015.
McAlister, A. J. The Al—Li (Aluminum-Lithium) System. Bulletin of Alloy Phase Diagrams, vol. 3, No. 2, 1982, pp. 177-178. doi: 10.1007/BF02892377.
Merriam-Webster's Medical Dictionary Website. http://merriam-webster.com/medical/room%20temperature. Apr. 2009.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.
Ning, et al. Self-healing Li—Bi liquid metal battery for grid-scale energy storage. Journal of Power Sourches 275 (2015) 370-376. Available online Oct. 29, 2014.
Norbert Weber et al., Sloshing instability and electrolyte layer rupture in liquid metal batteries. arxiv.org, Cornell university library, 201 OLIN library Cornell university ithaca, NY 14853, Dec. 12, 2016, XP081362128.
Notice of allowance dated Jan. 6, 2015 for U.S. Appl. No. 13/237,215.
Notice of allowance dated Jan. 11, 2018 for U.S. Appl. No. 15/136,337.
Notice of allowance dated Mar. 8, 2016 for U.S. Appl. No. 13/801,333.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 11, 2017 for U.S. Appl. No. 14/688,214.
Notice of allowance dated Apr. 13, 2017 for U.S. Appl. No. 14/688,179.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
"Notice of allowance dated May 11, 2017 for U.S. Appl. No. 14/688,214".
Notice of allowance dated Jul. 5, 2016 for U.S. Appl. No. 14/178,806.
Notice of allowance dated Jul. 13, 2012 for U.S. Appl. No. 11/839,413.
"Notice of allowance dated Jul. 17, 2017 for U.S. Appl. No. 14/688,214".
Notice of allowance dated Jul. 25, 2016 for U.S. Appl. No. 14/286,369.
"Notice of allowance dated Jul. 28, 2017 for U.S. Appl. No. 14/688,214".
Notice of allowance dated Jul. 31, 2015 for U.S. Appl. No. 13/801,333.
Notice of allowance dated Aug. 2, 2012 for U.S. Appl. No. 12/505,937.
Notice of allowance dated Aug. 22, 2016 for U.S. Appl. No. 14/536,549.
"Notice of allowance dated Sep. 11, 2017 for U.S. Appl. No. 15/289,857".
Notice of allowance dated Sep. 18, 2015 for U.S. Appl. No. 13/801,333.
"Notice of allowance dated Sep. 28, 2017 for U.S. Appl. No. 14/688,214".
Notice of allowance dated Oct. 4, 2017 for U.S. Appl. No. 15/136,337.
Notice of allowance dated Oct. 7, 2016 for U.S. Appl. No. 14/178,806.
Notice of allowance dated Oct. 19, 2017 for U.S. Appl. No. 14/688,214.
Notice of allowance dated Nov. 17, 2017 for U.S. Appl. No. 15/136,337.
Notice of allowance dated Dec. 11, 2015 for U.S. Appl. No. 13/801,333.
Notice of allowance dated Dec. 20, 2017 for U.S. Appl. No. 15/136,337.
Notice of allowance dated Mar. 22, 2017 for U.S. Appl. No. 14/536,563.
"Notice of allowance dated Aug. 31, 2018 for U.S. Appl. No. 15/057,732".
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS A Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems, http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
"Office action dated Feb. 5, 2016 for U.S. Appl. No. 14/536,549.".
Office action dated Mar. 14, 2014 for U.S. Appl. No. 13/237,215.
Office action dated Mar. 16, 2012 for U.S. Appl. No. 12/839,130.
"Office action dated Mar. 27, 18 for U.S. Appl. No. 15/140,434.".
"Office action dated Apr. 18, 2018 for U.S. Appl. No. 14/975,587.".
"Office action dated Apr. 20, 2018 for U.S. Appl. No. 15/057,732.".
"Office action dated May 1, 2017 for U.S. Appl. No. 14/678,602.".
Office action dated May 13, 2011 for U.S. Appl. No. 11/839,413.
Office action dated Jun. 7, 2016 for U.S. Appl. No. 14/045,967.
"Office action dated Jun. 7, 2018 for U.S. Appl. No. 14/687,838.".
"Office action dated Jun. 15, 2017 for U.S. Appl. No. 14/687,838".
"Office action dated Jun. 25, 2018 for U.S. Appl. No. 15/063,842.".
Office action dated Jun. 30, 2016 for U.S. Appl. No. 14/536,563.
Office action dated Jul. 31, 2015 for U.S. Appl. No. 14/210,051.
Office action dated Aug. 21, 2014 for U.S. Appl. No. 12/839,130.
"Office action dated Aug. 30, 2017 for U.S. Appl. No. 14/975,587".
Office action dated Sep. 3, 2014 for U.S. Appl. No. 13/801,333.
"Office action dated Sep. 5, 2017 for U.S. Appl. No. 15/140,434".
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 13, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Office action dated Nov. 24, 2015 for U.S. Appl. No. 14/045,967.
Office action dated Dec. 1, 2014 for U.S. Appl. No. 14/210,051.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of The Electrochemical Society. 2014; 161(12):A1898-A1904. Published Sep. 9, 2014.
Ouchi, et al. Calcium-based multi-element chemistry for grid-scale electrochemical energy storage. Nat Commun. Mar. 22, 2016;7:10999. doi: 10.1038/ncomms10999.With supplementary materials.
"Spatocco, et al. Low-Temperature Molten Salt Electrolytes for Membrane-Free Sodium Metal Batteries. Published Oct. 20, 2015, available at http://jes.ecsdl.org/content/162/14/A2729.full.pdf+html".
PCT/US2017/050544 International Search Report dated Apr. 24, 2018.
PCT/US2018/026601 International Search Report dated Jul. 30, 2018.
PCT/US2019/066231 International Search Report and Written Opinion dated Mar. 2, 2020.

(56) References Cited

OTHER PUBLICATIONS

Pflanz, K. A Liquid Layer Solution for the Grid, http://energy.gov/articles/liquid-layer-solution-grid. Sep. 15, 2011. Accessed Jul. 2, 2015.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Qingsong; Wang et al., "Thermal Runaway Caused Fire and Explosion of Lithium Ion Battery", Journal of Power Sources, 2012, 208, 210-224.
Response After Final Rejection dated Apr. 27, 2012 for U.S. Appl. No. 12/839,130.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Shimotake, et al. Bimetallic Galvanic Cells With Fused-Salt Electrolytes. Advances in Energy Conversion Engineering. pp. 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. pp. 1-43. Adv. In Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
U.S. Appl. No. 15/647,468 Notice of Allowance dated Oct. 2, 2019.
U.S. Appl. No. 14/687,838 Notice of Allowance dated Nov. 26, 2019.
U.S. Appl. No. 14/975,587 Notice of Allowance dated Jan. 9, 2019.
U.S. Appl. No. 14/975,587 Notice of Allowance dated Mar. 15, 2019.
U.S. Appl. No. 14/975,587 Notice of Allowance dated Oct. 9, 2018.
U.S. Appl. No. 15/057,732 Notice of Allowance dated Oct. 10, 2018.
U.S. Appl. No. 15/063,842 Office Action dated Feb. 17, 2021.
U.S. Appl. No. 15/063,842 Office Action dated Feb. 26, 2019.
U.S. Appl. No. 15/063,842 Office Action dated May 27, 2020.
U.S. Appl. No. 15/063,842 Office Action dated Sep. 20, 2019.
U.S. Appl. No. 15/130,129 Office Action dated Dec. 6, 2018.
U.S. Appl. No. 15/130,129 Office Action dated Jul. 3, 2019.
U.S. Appl. No. 15/130,129 Office Action dated Jul. 9, 2020.
U.S. Appl. No. 15/130,292 Office Action dated Jan. 24, 2020.
U.S. Appl. No. 15/130,292 Office Action dated Mar. 20, 2019.
U.S. Appl. No. 15/130,292 Office Action dated Nov. 19, 2018.
U.S. Appl. No. 15/140,434 Office Action dated Jun. 12, 2019.
U.S. Appl. No. 15/140,434 Office Action dated Sep. 19, 2018.
U.S. Appl. No. 15/647,468 Notice of Allowance dated Oct. 24, 2019.
U.S. Appl. No. 15/647,468 Office Action dated Jun. 5, 2019.
U.S. Appl. No. 15/690,863 Notice of Allowance dated Jan. 22, 2020.
U.S. Appl. No. 15/690,863 Office Action dated May 17, 2019.
U.S. Appl. No. 15/836,038 Notice of Allowance dated Jan. 9, 2019.
U.S. Appl. No. 16/202,758 Notice of Allowance dated Nov. 8, 2019.
U.S. Appl. No. 16/202,758 Notice of Allowance dated Oct. 7, 2019.
U.S. Appl. No. 16/592,621 Office Action dated Jul. 6, 2021.
Vassiliev, et al. A new proposal for the binary (Sn,Sb) phase diagram and its thermodynamic properties based on a new e.m.f study Journal of Alloys and Compounds 247 (1997) 223-233.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.
Weaver, et al. The Sodium1Tin Liquid-Metal Cell. J. Electrochem. Soc., 109 (8), 653-657 (Aug. 1962).
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12, 1500271, Published online Apr. 17, 2015.
Yu, et al. Determination of the Lithium Ion Diffusion Coefficient in Graphite. J. Electrochem. Soc. 1999 vol. 146, issue 1, 8-14.
Zhang; et al. Pyrite FeS2 as an efficient adsorbent of lithium polysulfide for improved lithium-sulfur batteries. Journal of Materials Chemistry A, vol. 4, Feb. 23, 2016, pp. 4371-4374. doi: 10.1039/C6TA01214K. With supporting information.

\* cited by examiner

A

B

C

ELECTROCHEMICAL ENERGY STORAGE DEVICES

CROSS-REFERENCE

This application is a continuation of U.S. patent application Ser. No. 15/647,468, filed Jul. 12, 2017, which is a continuation-in-part application of U.S. patent application Ser. No. 14/688,179, filed Apr. 16, 2015 (now U.S. Pat. No. 9,735,450), which is a continuation of PCT Application No. PCT/US2013/065092, filed Oct. 15, 2013, which claims the benefit of U.S. Provisional Application No. 61/715,821, filed Oct. 18, 2012, and which is a continuation-in-part of U.S. patent application Ser. No. 13/801,333, filed Mar. 13, 2013 (now U.S. Pat. No. 9,312,522), which claims the benefit of U.S. Provisional Application No. 61/763,925, filed Feb. 12, 2013, and U.S. Provisional Application No. 61/715,821, filed Oct. 18, 2012, and a continuation-in-part of U.S. patent application Ser. No. 14/536,563, filed Nov. 7, 2014 (now U.S. Pat. No. 9,728,814), which is a continuation of U.S. patent application Ser. No. 14/178,806. filed Feb. 12, 2014, (now U.S. Pat. No. 9,520,618), which claims the benefit of U.S. Provisional Application No. 61/763,925, filed Feb. 12, 2013, each of which is entirely incorporated herein by reference.

BACKGROUND

A battery can be a device capable of converting stored chemical energy into electrical energy. Batteries can be used in many household and industrial applications. In some instances, batteries are rechargeable such that electrical energy is capable of being stored in the battery as chemical energy (i.e., charging the battery). The battery can be coupled to a load (e.g., electrical appliance) and employed for use in performing work.

SUMMARY

The present disclosure recognizes a need for energy storage devices (e.g., batteries) that are capable of storing a large amount of energy and are transportable on a vehicle (e.g., truck). Several aspects of the energy storage devices are described.

An aspect of the present disclosure provides an energy storage device comprising at least one liquid metal electrode, wherein the energy storage device has an energy storage capacity of at least about 1 kWh and a response time less than or equal to about 100 milliseconds (ms).

Another aspect of the present disclosure provides an energy storage device comprising at least one liquid metal electrode stored in a container at a temperature greater than or equal to about 250° C., wherein the energy storage device has an energy storage capacity of at least about 1 kWh, and wherein the container has a surface area-to-volume ratio that is less than or equal to about 100 $m^{-1}$.

Another aspect of the present disclosure provides an energy storage device comprising at least one liquid metal electrode, wherein the energy storage device maintains at least 90% of its energy storage capacity after 100 charge/discharge cycles, and wherein the energy storage device has an energy storage capacity of at least about 1 kWh.

Another aspect of the present disclosure provides an energy storage device comprising at least one liquid metal electrode, wherein the device is transportable on a vehicle and has an energy storage capacity of at least about 1 kWh, and wherein the energy storage device is transportable with at least any two of an anode, cathode and electrolyte of the energy storage device in solid state.

Another aspect of the present disclosure provides an energy storage device comprising a container containing one or more cells, an individual cell of the one or more cells containing at least one liquid metal electrode, wherein a rate of heat generation in the cell during charge/discharge is about equal to a rate of heat loss from the cell.

Another aspect of the present disclosure provides a separator-less energy storage device comprising a container with at least one liquid metal electrode, wherein the container has a surface area-to-volume ratio that is less than or equal to about 100 $m^{-1}$, and the separator-less energy storage device has (i) a response time less than or equal to about 100 milliseconds (ms), and/or (ii) an energy storage capacity of at least about 1 kWh.

Another aspect of the present disclosure provides a method for forming an energy storage device, comprising shipping a container comprising an energy storage material in solid state to a destination location, and at the destination location supplying energy to the energy storage material to form at least one of a liquid metal anode, liquid metal cathode, and liquid electrolyte, thereby forming the energy storage device.

Another aspect of the present disclosure provides an energy storage system, comprising: (a) a container comprising one or more energy storage cells, wherein an individual energy storage cell of the one or more energy storage cells comprises an energy storage material comprising at least one liquid metal electrode; and (b) a control system comprising a processor with machine-executable code for monitoring at least one temperature of the one or more energy storage cells and/or the container, wherein the processor regulates the flow of electrical energy into at least a subset of the one or more energy storage cells such that the energy storage material undergoes sustained self heating during charge/discharge.

Another aspect of the present disclosure provides an energy storage device comprising at least one electrochemical cell having an operating temperature, the at least one electrochemical cell comprising: (a) a liquid negative electrode comprising a first metal; (b) a liquid electrolyte adjacent to the liquid negative electrode; and (c) a liquid positive electrode adjacent to the liquid electrolyte, the liquid positive electrode comprising a second elemental metal that is different than the first metal, wherein the liquid electrolyte comprises a charged species of the first metal and an oppositely charged species of the second metal, and wherein the energy storage device is capable of being transported on a vehicle.

Another aspect of the present disclosure provides an energy storage device comprising a molten salt, wherein a liquid electronic conductor is extracted from the molten salt by oxidation and metal is extracted from the molten salt by reduction, and wherein the energy storage device is capable of being transported on a vehicle.

Another aspect of the present disclosure provides an electrometallurgical cell comprising a positive electrode and a negative electrode, wherein the electrodes are liquid, the reactants of reactions that occur at the electrodes are liquid, and the products of reactions that occur at the electrodes are liquid, and wherein the electrometallurgical cell is capable of being transported on a vehicle.

Another aspect of the present disclosure provides an energy storage device capable of being transported on a vehicle and having a power capacity of greater than 1 MW and: (a) a physical footprint smaller than about 100 $m^2$/MW;

(b) a cycle life greater than 3000 deep discharge cycles; (c) a lifespan of at least 10 years; (d) a DC-to-DC efficiency of at least 65%; (e) a discharge capacity of at most 10 hours; and (f) a response time of less than 100 milliseconds.

Another aspect of the present disclosure provides an energy storage device comprising a liquid electrode, the electrode comprising an additive, wherein the electrode is consumed and the additive is concentrated by operation of the device, and wherein a property of the device is determined by of the concentration of the additive, and wherein the energy storage device is capable of being transported on a vehicle.

Another aspect of the present disclosure provides an energy storage device comprising a liquid antimony electrode, a steel container and a layer of iron antimonide disposed therebetween, wherein the device is operated at less than 738° C., and wherein the energy storage device is capable of being transported on a vehicle.

Another aspect of the present disclosure provides an energy storage device comprising a liquid electrode and a current collector in contact with the electrode, wherein the liquid electrode is consumed in a reaction during operation of the device, and wherein the amount of liquid electrode is in stoichiometric excess relative to other reactants of the reaction such that the current collector is in contact with the liquid electrode when the reaction has proceeded to completion, and wherein the energy storage device is capable of being transported on a vehicle.

Another aspect of the present disclosure provides an energy storage device comprising an alkaline earth metal present in each of a positive electrode, a negative electrode and a liquid electrolyte, wherein the energy storage device is capable of being transported on a vehicle.

Another aspect of the present disclosure provides an energy storage device comprising an alkaline earth metal present in each of an elemental form, an alloy form and a halide form, wherein the energy storage device is capable of being transported on a vehicle.

Another aspect of the present disclosure provides an energy storage device comprising a liquid anode, a liquid cathode and a liquid electrolyte disposed therebetween, wherein the thickness of the electrolyte is substantially constant through a charge-discharge cycle of the device, and wherein the energy storage device is capable of being transported on a vehicle.

Another aspect of the present disclosure provides an energy storage device comprising a liquid anode, a liquid cathode and a liquid electrolyte disposed therebetween, wherein the thickness of the electrolyte is less than 50% of the thickness of the cathode or the anode, and wherein the energy storage device is capable of being transported on a vehicle.

Another aspect of the present disclosure provides an energy storage device comprising a liquid electrode comprising an elemental alkaline earth metal and an electrolyte comprising a halide of the alkaline earth metal, wherein the electrolyte further comprises complexing ligands, and wherein the energy storage device is capable of being transported on a vehicle.

Another aspect of the present disclosure provides an energy storage device comprising a conductive housing comprising a conductive liquid anode, a conductive liquid cathode and an electrolyte disposed therebetween, wherein the interior surface of the container is not electrically insulated, and wherein the energy storage device is capable of being transported on a vehicle.

Another aspect of the present disclosure provides an energy storage device comprising an anode comprising a first electronically conductive liquid and a cathode comprising a second electronically conductive liquid, wherein the device is configured to impede mixing of the electronically conductive liquids, and wherein the energy storage device is capable of being transported on a vehicle.

Another aspect of the present disclosure provides an energy storage device comprising a negative electrode comprising an alkali metal, a positive electrode comprising the alkali metal and one or more additional elements and a liquid electrolyte disposed between the electrodes, wherein the electrolyte is not depleted upon charging or discharging of the device, and wherein the energy storage device is capable of being transported on a vehicle.

Another aspect of the present disclosure provides an energy storage device comprising a liquid metal electrode, a second metal electrode that is a liquid and an electrolyte disposed between the electrodes, wherein the electrolyte is a paste, and wherein the energy storage device is capable of being transported on a vehicle.

Another aspect of the present disclosure provides an energy storage device comprising a liquid negative electrode comprising an alkali metal, a liquid positive electrode comprising an alloy of the alkali metal and an electrolyte disposed between the electrodes, wherein the electrolyte comprises a salt of the alkali metal and particles, and wherein the energy storage device is capable of being transported on a vehicle.

Another aspect of the present disclosure provides an energy storage device comprising a metal anode, a metal cathode and an electrolyte disposed between the electrodes, wherein the anode, cathode and electrolyte are liquids at an operating temperature of the device and the operating temperature of the device is less than 500° C., and wherein the energy storage device is capable of being transported on a vehicle.

Another aspect of the present disclosure provides a method for charging an energy storage device comprising connecting an external charging circuit to terminals of the energy storage device that is capable of being transported on a vehicle such that an active alkali metal moves from a positive electrode, through an electrolyte, to a negative electrode comprising a metal having a higher chemical potential than the positive electrode.

Another aspect of the present disclosure provides a method for discharging an energy storage device comprising connecting an external load to terminals of the energy storage device that is capable of being transported on a vehicle such that an active alkali metal moves from a negative electrode, through an electrolyte as cations, to a positive electrode where the active alkali metal forms a neutral metal having a lower chemical potential than the negative electrode.

Another aspect of the present disclosure provides an energy storage device comprising a liquid metal electrode, an electrolyte and a current collector in contact with the electrode, wherein the current collector comprises a material that has a greater wetability with the liquid metal than with the electrolyte.

Another aspect of the present disclosure provides an electrochemical energy storage device comprising an anode, a cathode and an electrolyte between said anode and said cathode, wherein the device is not capable of conducting ions through said electrolyte at a first temperature, and wherein the device is capable of conducting ions through said electrolyte at a second temperature that is greater than said first temperature, and wherein said device is configured to be transported at the first temperature at a potential difference between said anode and said cathode that is less than 1 volt.

Another aspect of the present disclosure provides an electrochemical energy storage device comprising a negative electrode and a positive electrode and an electrolyte disposed between said negative and positive electrodes, wherein the electrochemical energy storage device has a first potential difference between the negative and positive electrodes at a first temperature that is less than about 50° C. and a second potential difference between the negative and positive electrodes at a second temperature of at least about 250° C., wherein the second potential difference is greater than the first potential difference.

Another aspect of the present disclosure provides a method for forming an energy storage system, comprising: (a) forming, at a first location, an energy storage device comprising a negative electrode and a positive electrode, and an electrolyte between the negative electrode and the positive electrode, wherein the negative electrode, positive electrode and electrolyte are in the liquid at an operating temperature of the energy storage device; and (b) placing the energy storage device on a vehicle that is configured to transport the energy storage device from the first location to a second location.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

DETAILED DESCRIPTION

Figure 1:
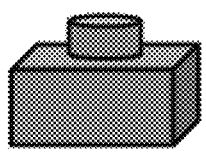
FIG. 1 is a illustration of an electrochemical cell (A) and a compilation (i.e., battery) of electrochemical cells (B and C)
Figure 1:
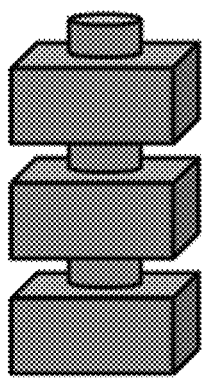
Figure 1:
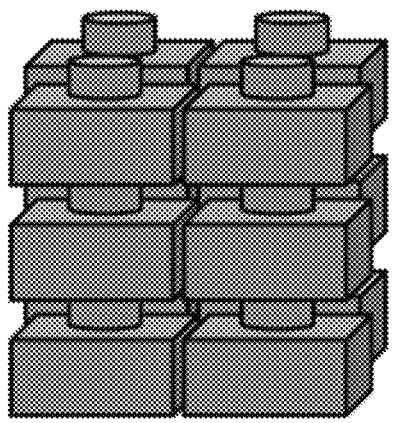

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "surface area," as used herein, generally refers to the geometric surface area of an object.

The term "vehicle," as used herein, generally refers to a car, truck, train, motorcycle, helicopter, plane, ship, boat, or robot. A vehicle can be manned or unmanned. A vehicle can be configured to travel alone a road or other pathway, such as a waterway. A vehicle can be coupled to a trailer or other container that is configured to house an energy storage device or a container having the energy storage device.

The term "cell," as used herein, generally refers to an electrochemical cell. A cell can include a negative electrode of material 'A' and a positive electrode of material 'B', denoted as A∥B. The positive and negative electrodes can be separated by an electrolyte.

The term "module," as used herein, generally refers to cells that are attached together in parallel by, for example, mechanically connecting the cell housing of one cell with the cell housing of an adjacent cell (e.g., cells that are connected together in an approximately horizontal packing plane). A module can include a plurality of cells in parallel. A module can comprise any number of cells (e.g., 2, 3, 4, 5, 6, 7, 8, 9, 10, 11, 12, 13, 14, 15, 16, 17, 18, 19, 20, or more). In some cases, a module comprises 9, 12, or 16 cells. In some cases, a module is capable of storing about 700 Watt-hours of energy and/or delivering about 175 Watts of power.

The term "pack," as used herein, generally refers to modules that are attached through different electrical connections (e.g., vertically). A pack can comprise any number of modules (e.g., 1, 2, 3, 4, 5, 6, 7, 8, 9, 10, 11, 12, 13, 14, 15, 16, 17, 18, 19, 20, or more). In some cases, a pack comprises 3 modules. In some cases, a pack is capable of storing about 2 kilo-Watt-hours of energy and/or delivering about 0.5 kilo-Watts of power.

The term "core," as used herein generally refers to a plurality of modules or packs that are attached through different electrical connections (e.g., in series and/or parallel). A core can comprise any number of modules or packs (e.g., 1, 2, 3, 4, 5, 6, 7, 8, 9, 10, 11, 12, 13, 14, 15, 16, 17, 18, 19, 20, or more). In some cases, the core also comprises mechanical, electrical, and thermal systems that allow the core to efficiently store and return electrical energy in a controlled manner. In some cases, a core comprises 12 packs. In some cases, a core is capable of storing about 25 kilo-Watt-hours of energy and/or delivering about 6.25 kilo-Watts of power.

The term "pod," as used herein, generally refers to a plurality of cores that are attached through different electrical connections (e.g., in series and/or parallel). A pod can comprise any number of cores (e.g., 1, 2, 3, 4, 5, 6, 7, 8, 9, 10, 11, 12, 13, 14, 15, 16, 17, 18, 19, 20, or more). In some cases, the pod contains cores that are connected in parallel with appropriate by-pass electronic circuitry, thus enabling a core to be disconnected while continuing to allow the other cores to store and return energy. In some cases, a pod comprises 4 cores. In some cases, a pod is capable of storing about 100 kilo-Watt-hours of energy and/or delivering about 25 kilo-Watts of power.

The term "system," as used herein, generally refers to a plurality of cores or pods that are attached through different electrical connections (e.g., in series and/or parallel). A system can comprise any number of cores or pods (e.g., 2, 3, 4, 5, 6, 7, 8, 9, 10, 11, 12, 13, 14, 15, 16, 17, 18, 19, 20, or more). In some cases, a system comprises 20 pods. In some cases, a system is capable of storing about 2 megawatt-hours of energy and/or delivering about 500 kilowatts of power.

The term "battery," as used herein, generally refers to one or more electrochemical cells connected in series and/or parallel. A battery can comprise any number of electrochemical cells, modules, packs, cores, pods or systems.

Electrochemical Energy Storage Cells, Devices and Systems

The disclosure provides electrochemical energy storage devices (batteries) and systems. An electrochemical energy storage device generally includes at least one electrochemical cell, also "cell" and "battery cell" herein, sealed (e.g., hermetically sealed) within a housing.

An electrochemical cell of the disclosure may include a negative electrode, an electrolyte adjacent to the negative electrode, and a positive electrode adjacent to the electrolyte. The negative electrode can be separated from the positive electrode by the electrolyte. The negative electrode can be an anode during discharging. The positive electrode can be a cathode during discharging. In some examples, an electrochemical cell is a liquid metal battery cell. In some examples, a liquid metal battery cell can include a liquid electrolyte arranged between a negative liquid (e.g., molten) metal electrode and a positive liquid (e.g., molten) metal, metalloid and/or non-metal electrode. In some cases, a liquid metal battery cell has a molten alkali metal (e.g., lithium, magnesium, sodium) negative electrode, an electrolyte, and a molten metal positive electrode. The molten metal positive electrode can include one or more of tin, lead, bismuth, antimony, tellurium and selenium. Any description of a metal or molten metal positive electrode, or a positive electrode, herein may refer to an electrode including one or more of a metal, a metalloid and a non-metal. The positive electrode may contain one or more of the listed examples of materials. In an example, the molten metal positive electrode can include lead and antimony. In some examples, the molten metal positive electrode may include an alkali metal alloyed in the positive electrode.

In some examples, an electrochemical energy storage device includes a liquid metal negative electrode, a liquid metal positive electrode, and a liquid metal electrolyte separating the liquid metal negative electrode and the liquid metal positive electrode. The negative electrode can include an alkali metal, such as lithium, sodium, potassium, rubidium, cesium, or combinations thereof. The positive electrode can include elements selected from Group IIIA, IVA, VA and VIA of the periodic table of the elements, such as aluminum, gallium, indium, silicon, germanium, tin, lead, pnicogens (e.g., arsenic, bismuth and antimony), chalcogens (e.g., tellurium and selenium), or combinations thereof. The electrolyte can include a salt (e.g., molten salt), such as an alkali metal salt. The alkali metal salt can be a halide, such as a fluoride, chloride, bromide, or iodide of the active alkali metal, or combinations thereof. In an example, the electrolyte includes lithium chloride. As an alternative, the salt of the active alkali metal can be, for example, a non-chloride halide, bistriflimide, fluorosulfano-amine, perchlorate, hexaflourophosphate, tetrafluoroborate, carbonate, hydroxide, or combinations thereof.

In some cases, the negative electrode and the positive electrode of an electrochemical energy storage device are in the liquid state at an operating temperature of the energy storage device. To maintain the electrodes in the liquid states, the battery cell may be heated to any suitable temperature. In some examples, the battery cell is heated to and/or maintained at a temperature of about 200° C., about 250° C., about 300° C., about 350° C., about 400° C., about 450° C., about 500° C., about 550° C., about 600° C., about 650° C., or about 700° C. The battery cell may be heated to and/or maintained at a temperature of at least about 200° C., at least about 250° C., at least about 300° C., at least about 350° C., at least about 400° C., at least about 450° C., at least about 500° C., at least about 550° C., at least about 600° C., at least about 650° C., or at least about 700° C. In some situations, the battery cell is heated to between 200° C. and about 500° C., or between about 300° C. and 450° C.

Electrochemical cells of the disclosure may be adapted to cycle between charged (or energy storage) modes and discharged modes. In some examples, an electrochemical cell can be fully charged, partially charged or partially discharged, or fully discharged.

In some implementations, during a charging mode of an electrochemical energy storage device, electrical current received from an external power source (e.g., a generator or an electrical grid) may cause metal atoms in the metal positive electrode to release one or more electrons, dissolving into the electrolyte as a positively charged ion (i.e., cation). Simultaneously, cations of the same species can migrate through the electrolyte, and may accept electrons at the negative electrode, causing the cations to transition to a neutral metal species, thereby adding to the mass of the negative electrode. The removal of the active metal species from the positive electrode and the addition of the active metal to the negative electrode stores electrochemical energy. During an energy discharge mode, an electrical load is coupled to the electrodes and the previously added metal species in the negative electrode can be released from the metal negative electrode, pass through the electrolyte as ions, and alloy with the positive electrode, with the flow of ions accompanied by the external and matching flow of electrons through the external circuit/load. This electrochemically facilitated metal alloying reaction discharges the previously stored electrochemical energy to the electrical load.

In a charged state, the negative electrode can include negative electrode material and the positive electrode can include positive electrode material. During discharging (e.g., when the battery is coupled to a load), the negative electrode material yields one or more electrons and cations of the negative electrode material. The cations migrate through the electrolyte to the positive electrode material and react with the positive electrode material to form an alloy. During charging, the alloy at the positive electrode disassociates to yield cations of the negative electrode material, which migrates through the electrolyte to the negative electrode.

In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, a lithium anode and a lithium chloride electrolyte can contribute a lithium cation to a cathode by a process in which a lithium cation formed at the anode interacts with the electrolyte to eject a lithium cation from the electrolyte into the cathode. The lithium cation formed at the anode in such a case may not necessarily migrate through the electrolyte to the cathode. The cation can be formed at an interface between the anode and the electrolyte, and accepted at an interface of the cathode and the electrolyte.

The present disclosure provides Type 1 and Type 2 cells, which can vary based on, and be defined by, the composition of the active components (e.g., negative electrode, electrolyte and positive electrode), and based on the mode of operation of the cells (e.g., low voltage mode versus high voltage mode).

In an example Type 1 cell, upon discharging, cations formed at the negative electrode can migrate into the electrolyte. Concurrently, the electrolyte can provide a cation of the same species (e.g., the cation of the negative electrode material) to the positive electrode, which can reduce from a cation to a neutrally charged metallic species, and alloy with the positive electrode. In a discharged state, the negative electrode can be depleted of the negative electrode material (e.g., Na, Li, Ca, Mg). During charging, the alloy at the positive electrode disassociates to yield cations of the negative electrode material (e.g. $Na^+$, $Li^+$, $Ca^{2+}$, $Mg^{2+}$), which migrate into the electrolyte. The electrolyte can then provide cations (e.g., the cation of the negative electrode material) to the negative electrode, which replenishes the negative electrode to provide a cell in a charged state. A Type 1 cell can operate in a push-pop fashion, in which the entry of a cation into the electrolyte results in the discharge of the same cation from the electrolyte.

In an example Type 2 cell, in a discharged state the electrolyte comprises cations of the negative electrode material (e.g., $Na^+$, $Li^+$, $Ca^{2+}$, $Mg^{2+}$), and the positive electrode comprises positive electrode material (e.g., Pb, Sn, Zn, Hg). During charging, a cation of the negative electrode material from the electrolyte accepts one or more electrons (e.g., from a negative current collector) to form the negative electrode comprising the negative electrode material. In some examples, the negative electrode material wets into a foam (or porous) structure of the negative current collector. Concurrently, positive electrode material from the positive electrode dissolves into the electrolyte as cations of the positive electrode material (e.g., $Pb^{2+}$, $Sn^{2+}$, $Zn^{2+}$, $Hg^{2+}$). The concentration of the cations of the positive electrode material can vary in vertical proximity within the electrolyte (e.g. as a function of distance above the positive electrode material) based on the atomic weight and diffusion dynamics of the cation material in the electrolyte. In some examples, the cations of the positive electrode material are concentrated in the electrolyte near the positive electrode.

Electrochemical cells of the disclosure can include housings that may be suited for various uses and operations. A housing can include one cell or a plurality of cells. A housing can be configured to electrically couple the electrodes to a switch, which can be connected to the external power source and the electrical load. The cell housing may include, for example, an electrically conductive container that is electrically coupled to a first pole of the switch and/or another cell housing, and an electrically conductive container lid, a portion of which is electrically coupled to a second pole of the switch and/or another cell housing. The cell can be arranged within a cavity of the container. A first one of the electrodes of the cell can contact and be electrically coupled with an endwall of the container. An electrically insulating sheath (e.g., alumina sheath) may electrically insulate remaining portions of the cell from other portions of the container. A conductor can electrically couple a second one of the electrodes of the battery cell to the container lid, which can seal (e.g., hermetically seal) the battery cell within the cavity. The container and the container lid can be electrically isolated. As an alternative, a housing does not include an electrically insulating sheath. In some cases, a housing and/or container may be a battery housing and/or container. An electrically conductive sheath (e.g. graphite sheath) may prevent the cathode from wetting up the side walls of the container.

A battery, as used herein, can comprise a plurality of electrochemical cells. Individual cells of the plurality can be electrically coupled to one another in series and/or in parallel and/or a combination of series and parallel connections. In serial connectivity, the positive terminal of a first cell is connected to a negative terminal of a second cell. In parallel connectivity, the positive terminal of a first cell can be connected to a positive terminal of a second cell.

Reference will now be made to the figures, wherein like numerals refer to like parts throughout. It will be appreciated that the figures and features therein are not necessarily drawn to scale.

With reference to FIG. 1, an electrochemical cell (A) is a unit comprising an anode and a cathode. The cell may comprise an electrolyte and be sealed in a housing as described herein. In some cases, the electrochemical cells can be stacked (B) to form a battery (i.e., a compilation of electrochemical cells). The cells can be arranged in parallel, in series, or both in parallel and in series (C).

Electrochemical cells of the disclosure may be capable of storing and/or receiving input of ("taking in") substantially large amounts of energy. In some instances, a cell is capable of storing and/or taking in about 1 watt hour (Wh), about 5 Wh, 25 Wh, about 50 Wh, about 100 Wh, about 500 Wh, about 1 kilo-Wh (kWh), about 1.5 kWh, about 2 kWh, about 3 kWh, about 5 kWh, about 10 kWh, about 100 kWh, about 500 kWh, about 1 MWh, about 5 MWh, about 10 MWh, about 50 MWh, or about 100 MWh. In some instances, the battery is capable of storing and/or taking in at least about 1 Wh, at least about 5 Wh, at least about 25 Wh, at least about 50 Wh, at least about 100 Wh, at least about 500 Wh, at least about 1 kWh, at least about 1.5 kWh, at least about 2 kWh, at least about 3 kWh, at least about 5 kWh, at least about 10 kWh, at least about 100 kWh, at least about 500 kWh, at least about 1 MWh, at least about 5 MWh, at least about 10 MWh, at least about 50 MWh, or at least about 100 MWh. A cell may be capable of providing a current at a current density of at least about 10 $mA/cm^2$, 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$, or 10 $A/cm^2$; where the current density is determined based on the effective cross-sectional area of the electrolyte and where the cross-sectional area is the area that is orthogonal to the net flow direction of ions through the electrolyte during charge or discharge processes.

A compilation or array of cells (i.e., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

Batteries of the disclosure may be capable of storing and/or taking in a substantially large amount of energy for use with a power grid (i.e., a grid-scale battery) or other loads or uses. In some instances, a battery is capable of storing and/or taking in about 5 kWh, 25 kWh, about 50 kWh, about 100 kWh, about 500 kWh, about 1 megawatt hour (MWh), about 1.5 MWh, about 2 MWh, about 3 MWh, about 5 MWh, or about 10 MWh. In some instances, the battery is capable of storing and/or taking in at least about 1 kWh, at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, or at least about 5 MWh, or at least about 10 MWh.

In some instances, the cells and cell housings are stackable. Any suitable number of cells can be stacked. Cells can be stacked side-by-side, on top of each other, or both. In some instances, at least about 10, 50, 100, or 500 cells are stacked. In some cases, a stack of about 1000 cells is capable of storing and/or taking in at least 50 kWh of energy. A first stack of cells (e.g., 10 cells) can be electrically connected to a second stack of cells (e.g., another 10 cells) to increase the number of cells in electrical communication (e.g., 20 in this instance).

An electrochemical energy storage device can include one or more individual electrochemical cells. An electrochemical cell can be housed in a container, which can include a container lid. The device can include at least 1, 2, 3, 4, 5, 6, 7, 8, 9, 10, 20, 30, 40, 50, 100, 200, 300, 400, 500, 1000, 10,000, 20,000, or 50,000 cells. The container lid may utilize, for example, a gasket (e.g., annular dielectric gasket) to electrically isolate the container from the container lid. Such a gasket may be constructed from a relatively hard electrically insulating material, such as, for example, glass, silicon oxide, aluminum oxide, boron nitride, aluminum nitride, or other oxides comprising of lithium oxide, calcium oxide, barium oxide, yttrium oxide, silicon oxide, aluminum oxide, or lithium nitride. The gasket may be subject to relatively high compressive forces (e.g., greater than 10,000 psi) between the container lid and the container in order to provide a seal in addition to electrical isolation. In order to subject the dielectric gasket to such high compressive forces, the fasteners may have relatively large diameters and may be closely spaced together. Such large diameter fasteners may be expensive and, thus, may significantly increase the cost to build a relatively large diameter container. In addition, as the diameter of the dielectric gasket is increased to accommodate a large diameter container, the gasket may become more and more fragile and difficult to maneuver.

Figure 2:
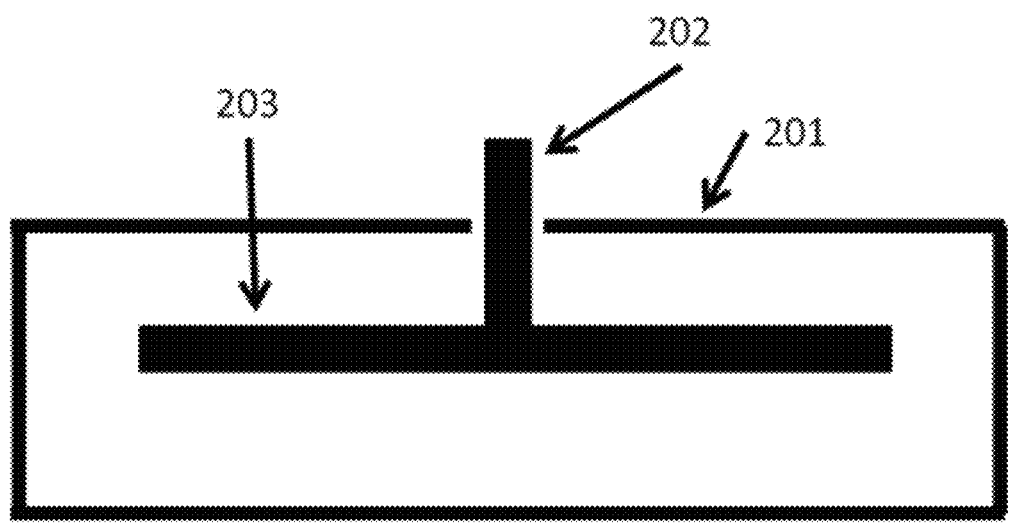
FIG. 2 is a schematic cross sectional illustration of a battery housing having a conductor in electrical communication with a current collector pass through an aperture in the housing.

FIG. 2 schematically illustrates a battery that comprises an electrically conductive housing 201 and a conductor 202 in electrical communication with a current collector 203. The conductor can be electrically isolated from the housing and can protrude through the housing through an aperture in the housing such that the conductor of a first cell contacts the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise kept in electrical communication with, the negative current collector. The positive electrode can be part of the positive current collector. As an alternative, the positive electrode can be separate from, but otherwise kept in electrical communication with, the positive current collector.

A cell housing can comprise an electrically conductive container and a conductor in electrical communication with a current collector. The conductor may protrude through the housing through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. In some cases, the ratio of the area of the aperture to the area of the housing is about 0.001, about 0.005, about 0.01, about 0.05, about 0.1, about 0.15, or about 0.2. In some cases, the ratio of the area of the aperture to the area of the housing is less than or equal to 0.001, less than or equal to 0.005, less than or equal to 0.01, less than or equal to 0.05, less than or equal to 0.1, less than or equal to 0.15, or less than or equal to 0.2.

A cell can comprise an electrically conductive housing and a conductor in electrical communication with a current collector. The conductor protrudes through the housing through an aperture in the housing and may be electrically isolated from the housing. The ratio of the area of the aperture to the area of the housing may be less than about 0.1.

A cell housing can comprise an electrically conductive container and a conductor in electrical communication with a current collector. The conductor protrudes through the container through an aperture in the container and is electrically isolated from the container. The ratio of the area of the aperture to the area of the container may be less than 0.1. The housing can be capable of enclosing a cell that is capable of storing and/or taking in less than 100 Wh of energy, about 100 Wh of energy, or more than 100 Wh of energy.

Figure 3:
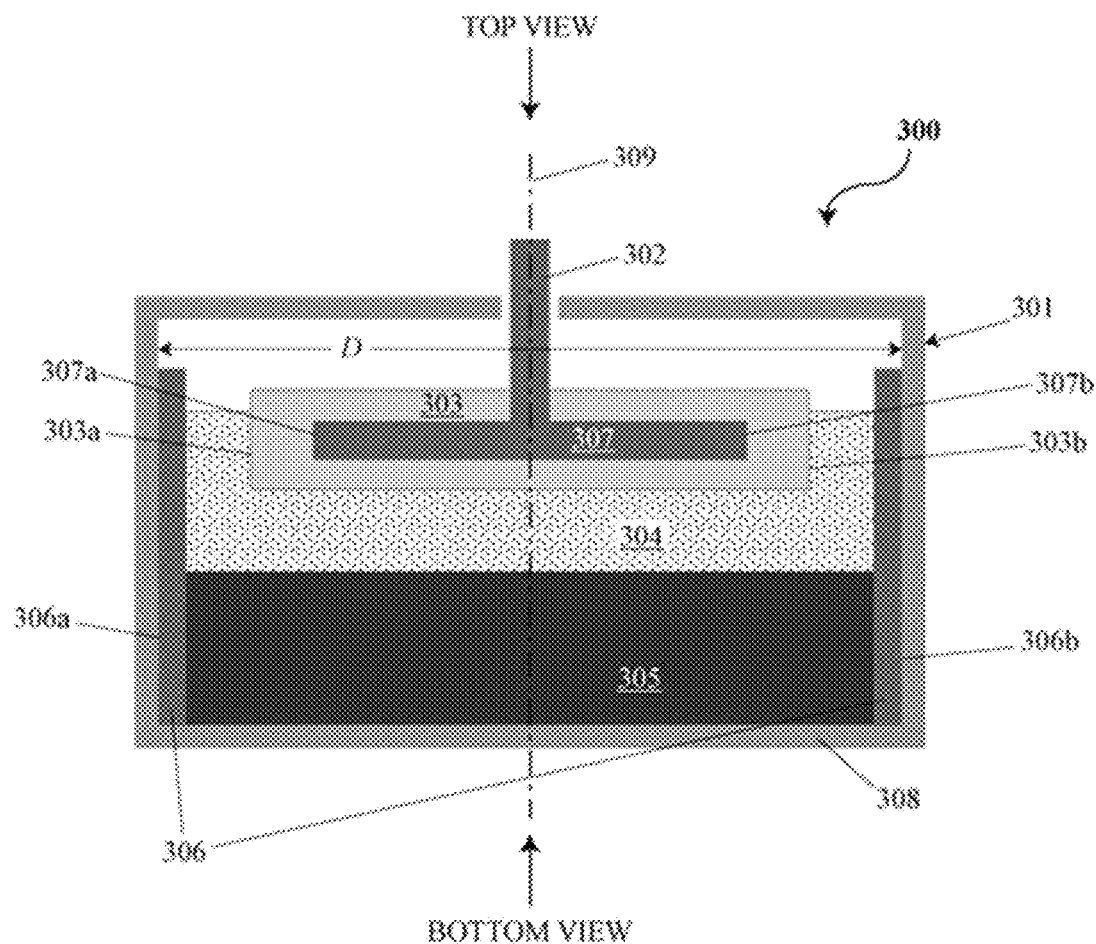
FIG. 3 is a cross-sectional side view of an electrochemical cell or battery.

FIG. 3 is a cross-sectional side view of an electrochemical cell or battery 300 comprising a housing 301, a conductive feed-through (i.e., conductor, such as a conductor rod) 302 that passes through an aperture in the housing and is in electronic communication with a liquid metal negative electrode 303, a liquid metal positive electrode 305, and a liquid metal electrolyte between the electrodes 303, 305. The conductor 302 may be electrically isolated from the housing 301 (e.g., using electrically insulating gaskets). The negative electrode 303 may be a foam that behaves like a sponge, and is "soaked" in liquid metal. The negative liquid metal electrode 303 is in contact with the molten salt electrolyte 304, which is in contact with the positive liquid metal electrode 305. The positive liquid metal electrode 305 can contact the housing 301 along the side walls and/or along the bottom end wall of the housing.

The foam can be porous. The foam can include pores that are sized to permit ions to flow through the pores. The foam can be sized to permit the liquid metal to flow through the foam.

The housing 301 can be constructed from an electrically conductive material such as, for example, steel, iron, stainless steel, graphite, nickel, nickel based alloys, titanium, aluminum, molybdenum, or tungsten. The housing may also comprise a thinner lining component of a separate metal or electrically insulating coating, such as, for example, a steel housing with a graphite lining, a steel housing with a boron or boron nitride coating, or titanium coating. The coating can exhibit favorable properties and functions, including surfaces that are anti-wetting to the positive electrode liquid metal. In some cases, the lining (e.g., graphite lining) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

The housing 301 may include a thermally and/or electrically insulating sheath 306. In this configuration, the negative electrode 303 may extend laterally between the side walls of the housing 301 defined by the sheath without being electrically connected (i.e., shorted) to the positive electrode 305. Alternatively, the negative electrode 303 may extend laterally between a first negative electrode end 303a and a second negative electrode end 303b. When the sheath 306 is not provided, the negative electrode 303 may have a diameter (or other characteristic dimension, illustrated in FIG. 3 as the distance from 303a to 303b) that is less than the diameter (or other characteristic dimension such as width for a cuboid container, illustrated in FIG. 3 as the distance D) of the cavity defined by the housing 301.

The sheath 306 can be constructed from a thermally insulating and/or electrically insulating material such as, for example, alumina, titania, silica, magnesia, boron nitride, or a mixed oxide including calcium oxide, aluminum oxide, silicon oxide, lithium oxide, magnesium oxide, etc. As shown in FIG. 3, the sheath 306 has an annular, square, or rectangular cross-sectional geometry that can extend laterally between a first sheath end 306a and a second sheath end 306b. The sheath may be dimensioned (illustrated in FIG. 3 as the distance from 306a to 306b) such that the sheath is in contact and pressed up against the side walls of the cavity defined by the housing cavity 301. As an alternative, the sheath can be used to prevent corrosion of the container and/or prevent wetting of the cathode material up the side wall, and may be constructed out of an electronically conductive material, such as steel, stainless steel, tungsten, molybdenum, nickel, nickel based alloys, graphite, or titanium. The sheath may be very thin and could be a coating. The coating can cover just the inside of the walls, and/or, can also cover the bottom of the inside of the container. In some cases, the sheath (e.g., graphite sheath) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

Instead of a sheath, the cell may comprise an electrically conductive crucible or coating that lines the side walls and bottom inner surface of the cell housing, referred to as a cell housing liner, preventing direct contact of the positive electrode with the cell housing. The cell housing liner may prevent wetting of the positive electrode between the cell housing and the cell housing liner or sheath and may prevent direct contact of the positive electrode on the bottom surface of the cell housing. The sheath may be very thin and can be a coating. The coating can cover just the inside of the walls, and/or, can also cover the bottom of the inside of the container. The sheath may not fit perfectly with the housing 301 which may hinder the flow of current between the cell lining and the cell housing. To ensure adequate electronic conduction between the cell housing and the cell lining, a liquid of metal that has a low melting point (i.e. Pb, Sn, Bi) can be used to provide a strong electrical connection between the sheath/coating and the cell housing. This layer can allow for easier fabrication and assembly of the cell.

The housing 301 can also include a first (e.g., negative) current collector 307 and a second (e.g., positive) current collector 308. The negative current collector 307 may be constructed from an electrically conductive material such as, for example, nickel-iron (Ni—Fe) foam, perforated steel disk, sheets of corrugated steel, sheets of expanded metal mesh, etc. The negative current collector 307 may be configured as a plate that can extend laterally between a first collector end 307a and a second collector end 307b. The negative current collector 307 may have a collector diameter that is less than or equal to the diameter of the cavity defined by the housing 301. In some cases, the negative current collector 307 may have a collector diameter (or other characteristic dimension, illustrated in FIG. 3 as the distance from 307a to 307b) that is less than, equal to, or more than the diameter (or other characteristic dimension, illustrated in FIG. 3 as the distance from 303a to 303b) of the negative electrode 303. The positive current collector 308 may be configured as part of the housing 301; for example, the bottom end wall of the housing may be configured as the positive current collector 308, as illustrated in FIG. 3. Alternatively, the current collector may be discrete from the battery housing and may be electrically connected to the battery housing. In some cases, the positive current collector may not be electrically connected to the battery housing. The present invention is not limited to any particular configurations of the negative and/or positive current collector configurations.

In some cases, a cell can include one or more alloyed products that are liquid, semi-liquid (or semi-solid), or solid. The alloyed products can be immiscible with the negative electrode, positive electrode and/or electrolyte. The alloyed products can form from electrochemical processes during charging or discharging of a cell.

An alloyed product can include an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode, or electrolyte, or at a location (e.g., interface) between the negative electrode and the electrolyte or between the positive electrode and the electrolyte. In an example, an alloyed product is an intermetallic between the positive electrode and the electrolyte (see FIG. 4). In other examples, the alloyed product can be at other locations within the cell and be formed of a material of different stoichiometries/compositions, depending on the chemistry, temperature, and/or charge state of the cell.

The negative electrode 303 can be contained within the negative current collector (e.g., foam) 307. In this configuration, the electrolyte layer comes up in contact with the bottom and sides of the foam 307, and the metal contained in the foam (i.e., the negative electrode material) can be held away from the sidewalls of the housing 301, thus allowing the cell to run without the insulating sheath 306. In some cases, a graphite sheath may be used to prevent the positive electrode from wetting up along the side walls, which can prevent shorting of the cell.

Current may be distributed substantially evenly across a positive and/or negative liquid metal electrode in contact with an electrolyte along a surface (i.e., the current flowing across the surface may be uniform such that the current flowing through any portion of the surface does not substantially deviate from an average current density). In some examples, the maximum density of current flowing across an area of the surface is less than about 105%, less than about 115%, less than about 125%, less than about 150%, less than about 175%, less than about 200%, less than about 250%, or less than about 300% of the average density of current flowing across the surface. In some examples, the minimum density of current flowing across an area of the surface is greater than about 50%, greater than about 60%, greater than about 70%, greater than about 80%, greater than about 90%, or greater than about 95% of the average density of current flowing across the surface.

The housing may include a container and a container lid as described elsewhere herein. The container and container lid may be connected mechanically and isolated electrically (e.g., using electrically insulating gaskets, fasteners with electrically insulating sleeves and/or electrically insulating washers constructed from a dielectric such as, for example, mica or vermiculite). In some examples, the electrochemical cell or battery 300 may comprise two or more conductors passing through one or more apertures and in electrical communication with the liquid metal negative electrode 303. In some instances, a separator structure (not shown) may be arranged within the electrolyte 304 between the liquid negative electrode 303 and the (liquid) positive electrode 305.

Viewed from a top or bottom direction, as indicated respectively by "TOP VIEW" and "BOTTOM VIEW" in FIG. 3, the cross-sectional geometry of the cell or battery 300 can be circular, elliptical, square, rectangular, polygonal, curved, symmetric, asymmetric or any other compound shape based on design requirements for the battery. In one example, the cell or battery 300 is axially symmetric with a circular cross-section. Components of cell or battery 300 (e.g., component in FIG. 3) may be arranged within the cell or battery in an axially symmetric fashion. In some cases, one or more components may be arranged asymmetrically, such as, for example, off the center of the axis 309.

The combined volume of positive and negative electrode material may be about 20%, about 30%, about 40%, about 50%, about 60%, about 70%, about 80%, about 90%, or about 95% of the volume of the battery (e.g., as defined by the outer-most housing of the battery, such as a shipping container). In some cases, the combined volume of anode and cathode material is at least 20%, at least 30%, at least 40%, at least about 50%, at least about 60%, at least about 70%, at least about 80%, at least about 90%, or at least about 95% of the volume of the battery. The combined volume of the positive and negative electrodes material may expand or contract during operation due to the expansion or contraction of the positive or negative electrode. In an example, during discharge, the volume of the negative electrode (anode during discharge) may be reduced due to transfer of the negative electrode material to the positive electrode (cathode during discharge), wherein the volume of the positive electrode is increased (e.g., as a result of an alloying reaction). The volume reduction of the negative electrode may or may not equal the volume increase of the positive electrode. The positive and negative electrode materials may react with each other to form a solid or semi-solid mutual reaction compound (also "mutual reaction product" herein), which may have a density that is the same, lower, or higher than the densities of the positive and/or negative electrode materials. Although the mass of material in the electrochemical cell or battery 300 may be constant, one, two or more phases (e.g., liquid or solid) may be present, and each such phase may comprise a certain material composition (e.g., an alkali metal may be present in the materials and phases of the cell at varying concentrations: a liquid metal negative electrode may contain a high concentration of an alkali metal, a liquid metal positive electrode may contain an alloy of the alkali metal and the concentration of the alkali metal may vary during operation, and a mutual reaction product of the positive and negative liquid metal electrodes may contain the alkali metal at a fixed or variable stoichiometry). The phases and/or materials may have different densities. As material is transferred between the phases and/or materials of the electrodes, a change in combined electrode volume may result.

Figure 4:
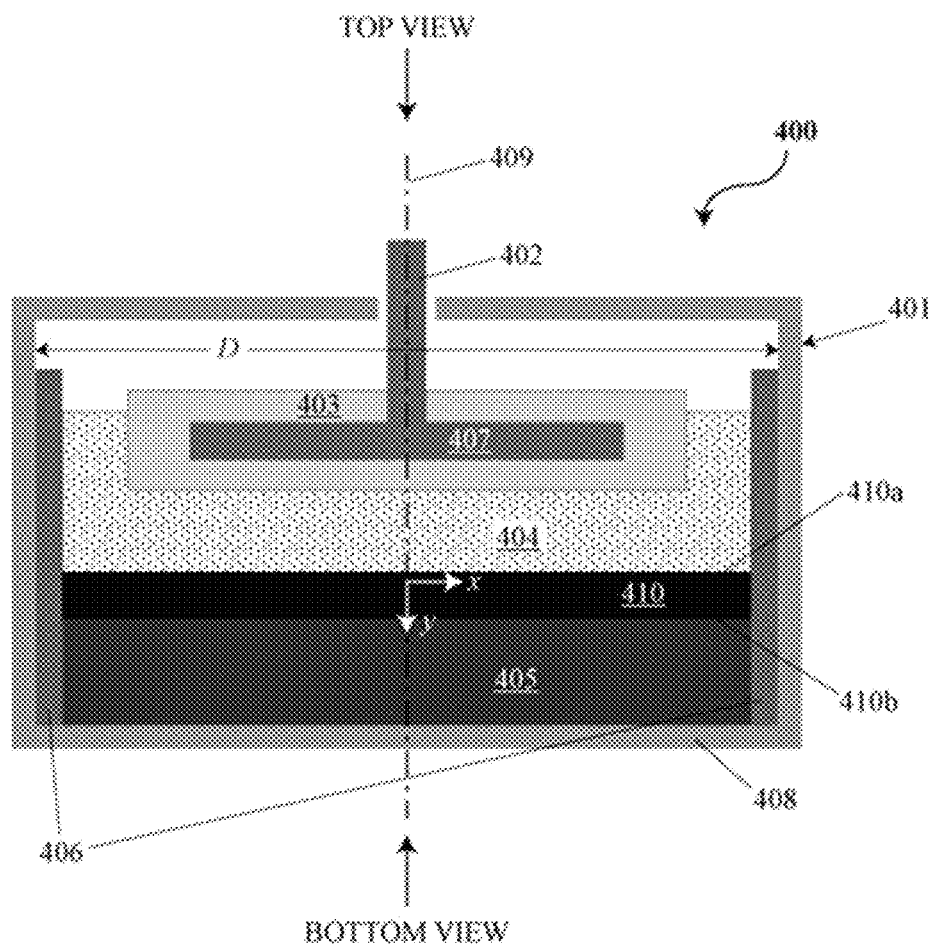
FIG. 4 is a cross-sectional side view of an electrochemical cell or battery with an intermetallic layer.

FIG. 4 is a cross-sectional side view of an electrochemical cell or battery 400 with an intermetallic layer 410. The intermetallic layer 410 can include a mutual reaction compound that may be formed during discharging at an interface between a positive liquid metal electrode (liquid metal cathode in this configuration) 405 and a liquid metal electrolyte 404. The mutual reaction compound (or product) can be solid or semi-solid. The intermetallic layer 410 can form at the interface between the liquid metal cathode 405 and the liquid metal electrolyte 404. In some cases, the intermetallic layer 410 may exhibit liquid properties (e.g., the intermetallic may be semi-solid, or it may be of a higher viscosity or density than one or more adjacent phases/materials).

In some cases, a negative liquid metal electrode 403 includes lithium, sodium, potassium, magnesium, and/or calcium, the positive liquid metal electrode 405 includes lead, antimony, tin, tellurium and/or bismuth. The intermetallic layer 410 can include any suitable compound such as magnesium antimonide ($Mg_3Sb_2$), calcium antimonide ($Ca_3Sb_2$), lithium antimonide ($Li_3Sb$), lithium bismuthide ($Li_3Bi$), sodium antimonide ($Na_3Sb$) or compounds that contain two or more of K, Li, Na, Pb, Bi, Sb, Te, Sn and the like.

In an example, a negative liquid metal electrode 403 includes magnesium (Mg), the positive liquid metal electrode 405 includes antimony (Sb), and the intermetallic layer 410 includes Mg and Sb ($Mg_xSb$, where 'x' is a number greater than zero), such as, for example, magnesium antimonide ($Mg_3Sb_2$). Cells with a Mg∥Sb chemistry may contain magnesium ions within the electrolyte as well as other salts (e.g., $MgCl_2$, NaCl, KCl, or a combination thereof). In a discharged state, the cell is deficient in Mg in the negative electrode and the positive electrode comprises an alloy of Mg—Sb, and during charging, Mg is supplied from the positive electrode, passes through the electrolyte as a positive ion, and deposits onto the negative current collector as Mg. In some examples, the cell has an operating temperature of at least about 550° C., 600° C., 650° C., 700° C., or 750° C., and in some cases between 650° C. and 750° C. In a charged state, all or substantially all the components of the cell are in a liquid state. Alternative chemistries exist, including Ca-Mg∥Bi comprising a calcium halide constituent in the electrolyte (i.e. $CaCl_2$, KCl, LiCl, or combinations thereof) and operating above 500° C., Li‖Pb-Sb cells comprising a lithium halide electrolyte (i.e. LiF, LiCl, LiBr, or combinations thereof) and operating between 350° C. and 550° C., and Na‖Pb cells comprising a sodium halide as part of the electrolyte (i.e. NaCl, NaF, LiCl, LiF, LiBr, KCl, KBr, or combinations thereof) and operating above 300° C. In some cases, the product of the discharge reaction may be an intermetallic compound (i.e. $Mg_3Sb_2$ for the Mg‖Sb cell chemistry, $Li_3Sb$ for the Li‖Pb-Sb chemistry, or $Ca_3Bi_2$ for the Ca—Mg‖Bi chemistry) where the intermetallic layer may develop as a distinct solid phase by growing and expanding horizontally along a direction x and/or growing or expanding vertically along a direction y at the interface between the positive electrode and the electrolyte. The solid intermetallic layer may develop by growing and expanding horizontally along a direction x. The expansion or growth may be axially symmetrical or asymmetrical with respect to an axis of symmetry 409 located at the center of the cell or battery 400. Alternatively, the solid intermetallic layer may develop and expand starting from one or more locations (also "nucleation sites" herein) along a surface parallel to the direction x (i.e., the interface between the liquid metal cathode and the liquid metal electrolyte). The nucleation sites may be located in a predetermined pattern along the surface; alternatively, the location of the nucleation sites may be stochastic (random), or determined by natural or induced defects at the interface between the liquid metal cathode and the liquid metal electrolyte, or elsewhere within the cell or battery 400. In some examples, the solid intermetallic layer may not grow and expand horizontally. For example, the solid intermetallic layer may form evenly across the interface.

The solid intermetallic layer may begin developing at or near a vertical location corresponding to the location of the upper surface of the liquid metal cathode at the commencement of discharging (i.e., the interface between the liquid metal cathode and the liquid metal electrolyte at the commencement of discharging), and may then grow in a downward direction y. Thus, the solid intermetallic layer may have an upper interface or surface 410a and a lower interface or surface 410b. The upper interface 410a may remain in an approximately fixed location along the axis 409, while the lower interface 410b moves in a downward direction during discharge. In some cases, the solid intermetallic layer may grow and/or deform in the downward direction (i.e., intermetallic material is added to the layer from the downward direction opposite to vector y). Material buildup along the interface 410b may cause pressure to build up from below. The pressure may exert a force on the intermetallic layer. The pressure may be hydraulic pressure from the liquid metal cathode 405. In some cases, the pressure may be due to material stresses in the intermetallic layer 410. This may, for example, cause the intermetallic layer 410 to bulge or bow upward. In some cases, the liquid metal cathode may break through the intermetallic layer and some liquid metal cathode material may eject into the liquid metal electrolyte past the upper surface of the intermetallic layer, forming fingers or dendritic outgrowths. The intermetallic layer may be partially distorted, and may be ruptured or cracked in one or more locations along the interface 410a.

In some cases, a combination of horizontal and downward growth may occur. For example, a layer having a thickness t may develop in a downward direction along the central axis, and expand horizontally during discharge at a thickness of less than t, about t, or larger than t. The thickness t may also change as a function of discharge or discharge time. The morphology of the interfaces 410a, 410b may not be as uniform as shown in FIG. 4. For example, the interfaces may be lumpy, jagged, uneven, spongy or have offshoots, fingers or dendritic characteristics. For example, the interface 410a can be undulating. Depending on the lateral extent of the intermetallic layer 410 with respect to the dimension of the cavity defined by the side walls of sheath 406 or housing 401 and/or the morphology of the intermetallic layer 410, one or more interfaces between the liquid metal electrolyte 404 and the liquid metal cathode 405 may exist. The interfaces may provide a means for reduction reactions to proceed at the liquid metal cathode. The solid intermetallic layer may grow by the addition of material formed at or near the interfaces.

During discharge, the cathode may comprise the liquid metal cathode 405, and the solid intermetallic layer 410 is formed adjacent to the cathode. As previously described, material can be transferred to the cathode during discharge such that the mass of the cathode grows. The cathode volume may expand as a result of the material addition. The volume expansion may be affected by the alloying reaction. For example, the cathode volume increase after alloying may be about 30% less than expected from adding together the volume of material added to the cathode and the material originally present in the cathode. In some cases, the densities of the intermetallic layer 410 and the liquid metal cathode 405 may be about the same. Alternatively, the density of the intermetallic layer may be higher or lower than the density of the liquid metal cathode 405. For example, the density of the intermetallic layer may be a function of the phase structure of the solid formed. As the cathode volume increases during discharging, individually, the intermetallic layer 410 may grow, but the liquid metal cathode 405 may be consumed. The intermetallic layer 410 may grow at the expense of the liquid metal cathode 405. Alternatively, the volumes of both the intermetallic layer 410 and the liquid metal cathode 405 may increase, but the increase in volume of the liquid metal cathode 405 is less than it would otherwise be in the absence of an intermetallic layer. In some examples, the alloy in the liquid metal cathode 405, and the alloy in the intermetallic layer 410 may be formed independently at the interfaces between the liquid metal electrolyte and the liquid metal cathode. Alternatively, the formation of the intermetallic layer 410 may consume alloy first formed in the liquid metal cathode 405. The expansion of the liquid metal cathode 405 confined by an intermetallic layer 410, and the sheath 406 or housing 401 may lead to hydraulic pressure buildup in the liquid metal cathode 405.

With continued reference to FIG. 4, the intermetallic 410 can be located between the liquid metal electrolyte 404 and the liquid metal cathode 405. During normal operation, the cell or battery 400 can be oriented in the direction shown in FIG. 4, such that any gravitational pull affecting the cell is oriented downward in the direction of the vectory. A hydrostatic pressure from the liquid metal electrolyte 404 may exert a downward force (in the direction of y) on the intermetallic layer 410. This force may remain constant during discharge, as the mass of the liquid metal electrolyte may not change. The upper interface 410a of the intermetallic layer may be stationary. As the intermetallic layer 410 grows, a hydraulic pressure may build up in the liquid metal cathode 405, and may exert an upward force (in the opposite direction from y) on the intermetallic layer 410.

In another aspect of the present disclosure, an energy storage device comprises at least one liquid metal electrode. The energy storage device can have a high energy storage capacity and a fast response time. The liquid metal electrode can be an anode or a cathode of the energy storage device. In some embodiments, the energy storage devices comprises a liquid metal anode (e.g., lithium, sodium, calcium, and/or potassium) and a liquid metal cathode (e.g., antinomy, bismuth, tellurium, tin, and/or lead). The energy storage device can also comprise a liquid electrolyte. In some embodiments, the reactions that occur at the electrode and liquid metal electrode interfaces are extremely facile, permitting high current density operation with minimal electrode overpotentials and extremely fast response times.

The energy storage capacity can be any suitably large value (e.g., suitable for grid-scale energy storage), including about 1 kWh, about 10 kWh, about 20 kWh, about 30 kWh, about 100 kWh, about 500 kWh, about 1 MWh, about 5 MWh, about 10 MWh, about 50 MWh, about 100 MWh, and the like. In some embodiments, the energy storage capacity is at least about 1 kWh, at least about 10 kWh, at least about 20 kWh, at least about 30 kWh, at least about 100 kWh, at least about 500 kWh, at least about 1 MWh, at least about 5 MWh, at least about 10 MWh, at least about 50 MWh, at least about 100 MWh and the like.

The response time can be any suitable value (e.g., suitable for responding to disturbances in the power grid). In some instances, the response time is about 100 milliseconds (ms), about 50 ms, about 10 ms, about 1 ms, and the like. In some cases, the response time is at most about 100 milliseconds (ms), at most about 50 ms, at most about 10 ms, at most about 1 ms, and the like.

In some embodiments, the liquid metal electrode comprises an alkali earth metal, a metalloid, or combinations thereof. In some embodiments, the liquid metal electrode comprises lithium, sodium, potassium, magnesium, calcium, or any combination thereof. In some cases, the liquid metal electrode comprises antimony, lead, tin, tellurium, bismuth or combinations thereof.

In some embodiments, the device is comprised in an array of energy storage devices as part of an energy storage system. The device can be an energy storage cell, and the energy storage system comprises a plurality of energy storage cells.

In another aspect of the present disclosure, an energy storage device comprises at least one liquid metal electrode stored in a container at a temperature greater than or equal to about 250° C. The energy storage device can have a high energy storage capacity and the container can have a surface area-to-volume ratio that is less than or equal to about 10 $m^{-1}$.

The energy storage capacity can be any suitably large value (e.g., suitable for grid-scale energy storage), including about 1 kWh, about 10 kWh, about 20 kWh, about 30 kWh, about 100 kWh, about 500 kWh, about 1 MWh, about 5 MWh, about 10 MWh, about 50 MWh, about 100 MWh, and the like. In some embodiments, the energy storage capacity is at least about 1 kWh, at least about 10 kWh, at least about 20 kWh, at least about 30 kWh, at least about 100 kWh, at least about 500 kWh, at least about 1 MWh, at least about 5 MWh, at least about 10 MWh, at least about 50 MWh, at least about 100 MWh and the like.

In some embodiments, the surface area-to-volume ratio is about 100 $m^{-1}$, about 50 $m^{-1}$, about 10 $m^{-1}$, about 1 $m^{-1}$, about 0.5 $m^{-1}$, about 0.1 $m^{-1}$, about 0.01 $m^{-1}$, or about 0.001 $m^{-1}$. In some cases, the surface area-to-volume ratio is less than about 100 $m^{-1}$, less than about 50 $m^{-1}$, less than about 10 $m^{-1}$, less than about 1 $m^{-1}$, less than about 0.5 $m^{-1}$, less than about 0.1 $m^{-1}$, less than about 0.01 $m^{-1}$, or less than about 0.001 $m^{-1}$.

The temperature can be any suitable temperature (e.g., for maintaining the electrodes in a molten state). In some embodiments, the at least one liquid metal electrode is stored in the container at a temperature greater than or equal to about 250° C., greater than or equal to about 400° C., greater than or equal to about 450° C. greater than or equal to about 500° C. or greater than or equal to about 550° C.

In another aspect of the present disclosure, an energy storage device comprises at least one liquid metal electrode and the energy storage device maintains at least 90% of its energy storage capacity after 100 charge/discharge cycles.

In some cases, the energy storage device has an energy storage capacity of at least about 1 kWh. In some embodiments, the energy storage device has an energy storage capacity of at least about 2 kWh, 3 kWh, 4 kWh, 5 kWh, 6 kWh, 7 kWh, 8 kWh, 9 kWh, 10 kWh, 20 kWh, 30 kWh, 100 kWh, 200 kWh, 300 kWh, 400 kWh, 500 kWh, 1 MWh, 5 MWh, or 10 MWh.

In some embodiments, the energy storage device maintains at least 90%, 95%, 96%, 97%, 98%, or 99% of its energy storage capacity after 100, 200, 300, 400, 500, or 1000, 3000, 5000, 10,000 charge/discharge cycles.

In some embodiments, an energy storage device comprises at least one liquid metal electrode, where the device is transportable on a vehicle and has an energy storage capacity of at least about 1 kWh. The energy storage device is transportable with at least any two of an anode, cathode and electrolyte of the energy storage device in solid state.

An energy storage device can be transported if it has less than a certain weight. In some embodiments, the energy storage device has a weight of about 10 kg, 100 kg, 500 kg, 1,000 kg, 2,000 kg, 3,000 kg, 4,000 kg, 5,000 kg, 10,000 kg, or 50,000 kg. In some embodiments, an individual cell of the energy storage device has a weight of about 0.1 kg, 0.5 kg, 1 kg, 2 kg, 3 kg, 4 kg, 5 kg, 10 kg, 100 kg, 1,000 kg, or 10,000 kg. In some embodiments, the energy storage device has a weight of at least about 10 kg, 100 kg, 500 kg, 1,000 kg, 2,000 kg, 3,000 kg, 4,000 kg, 5,000 kg, 10,000 kg, or 50,000 kg. In some embodiments, an individual cell of the energy storage device has a weight of at least about 0.1 kg, 0.5 kg, 1 kg, 2 kg, 3 kg, 4 kg, 5 kg, 10 kg, 100 kg, 1,000 kg, or 10,000 kg.

In some embodiments, an energy storage device comprises a container containing one or more cells, an individual cell of the one or more cells containing at least one liquid metal electrode, where a rate of heat generation in the cell during charge/discharge is about equal to a rate of heat loss from the cell.

The rate of heat generation can be any suitable value compared to the rate of heat loss from the cell (e.g., such that the battery is self-heating and/or maintains a constant temperature). In some cases, the ratio of the rate of heat generation to the rate of heat loss from the cell is about 50%, about 75%, about 80%, about 85%, about 90%, about 100%, about 110%, about 120%, or about 150%. In some instances, the ratio of the rate of heat generation to the rate of heat loss from the cell is at least about 50%, at least about 75%, at least about 80%, at least about 85%, at least about 90%, at least about 100%, at least about 110%, at least about 120%, or at least about 150%. In some instances, the ratio of the rate of heat generation to the rate of heat loss from the cell is at most about 50%, at most about 75%, at most about 80%, at most about 85%, at most about 90%, at most about 100%, at most about 110%, at most about 120%, or at most about 150%.

In another aspect of the present disclosure, a separator-less energy storage device comprises a container with at least one liquid metal electrode, where the container has a surface area-to-volume ratio that is less than or equal to about 100 $m^{-1}$, and the separator-less energy storage device has (i) a response time less than or equal to about 100 milliseconds (ms), and/or (ii) an energy storage capacity of at least about 1 kWh. In some embodiments, the separator-less energy storage devices comprises (i) and (ii). In some embodiments, the separator-less energy storage device does not include a separator.

The energy storage capacity can be any suitably large value (e.g., suitable for grid-scale energy storage), including about 1 kWh, about 10 kWh, about 20 kWh, about 30 kWh, about 100 kWh, about 500 kWh, about 1 MWh, about 5 MWh, about 10 MWh, about 50 MWh, about 100 MWh, and the like. In some embodiments, the energy storage capacity is at least about 1 kWh, at least about 10 kWh, at least about 20 kWh, at least about 30 kWh, at least about 100 kWh, at least about 500 kWh, at least about 1 MWh, at least about 5 MWh, at least about 10 MWh, at least about 50 MWh, at least about 100 MWh, and the like.

The response time can be any suitable value (e.g., suitable for responding to disturbances in the power grid). In some instances, the response time is about 100 milliseconds (ms), about 50 ms, about 10 ms, about 1 ms, and the like. In some cases, the response time is at most about 100 milliseconds (ms), at most about 50 ms, at most about 10 ms, at most about 1 ms, and the like.

In some embodiments, the surface area-to-volume ratio is about 100 $m^{-1}$, about 50 $m^{-1}$, about 10 $m^{-1}$, about 1 $m^{-1}$, about 0.5 $m^{-1}$, about 0.1 $m^{-1}$, about 0.01 $m^{-1}$, or about 0.001 $m^{-1}$. In some cases, the surface area-to-volume ratio is less than about 100 $m^{-1}$, less than about 50 $m^{-1}$, less than about 10 $m^{-1}$, less than about 1 $m^{-1}$, less than about 0.5 $m^{-1}$, less than about 0.1 $m^{-1}$, less than about 0.01 $m^{-1}$, or less than about 0.001 $m^{-1}$.

In another aspect of the present disclosure, a method for forming an energy storage device comprises shipping a container comprising an energy storage material in solid state to a destination location, and at the destination location supplying energy to the energy storage material to form at least one of a liquid metal anode, liquid metal cathode, and liquid electrolyte, thereby forming the energy storage device.

In some instances, the energy storage material is not mixed during shipping. In some cases, the energy storage device does not include a separator. In some embodiments, during shipping, the energy storage material comprises at least one of a solid state anode, solid state cathode and solid state electrolyte.

In another aspect of the present disclosure, an energy storage system comprises: (a) a container comprising one or more energy storage cells, where an individual energy storage cell of the one or more energy storage cells comprises an energy storage material comprising at least one liquid metal electrode; and (b) a control system comprising a processor with machine-executable code for monitoring at least one temperature of the one or more energy storage cells and/or the container. The processor can regulate the flow of electrical energy into at least a subset of the one or more energy storage cells such that the energy storage material undergoes sustained self-heating during charge/discharge. In some embodiments, the container comprises a plurality of energy storage cells.

In some embodiments, the processor regulates one or more process parameters of the individual energy storage cell such that a rate of heat dissipation from the individual energy storage cell during charge/discharge is greater than a rate of heat loss from the individual energy storage cell. In some embodiments, at least one liquid metal electrode is stored in the container at a temperature greater than or equal to about 250° C., greater than or equal to about 300° C., greater than or equal to about 350° C., greater than or equal to about 400° C., greater than or equal to about 450° C. greater than or equal to about 500° C. or greater than or equal to about 550° C.

Pressure Relief Mechanism for Cathode (Riser Pipes)

An aspect of the disclosure relates to pressure relief mechanisms for electrochemical cells or batteries. The pressure relief mechanisms can be applied, for example, in liquid metal batteries described herein. Examples include application of the pressure relief mechanisms to positive battery electrodes in liquid metal batteries (e.g., for pressure relief during battery discharging, when the positive battery electrode functions as a cathode). The pressure relief mechanisms may be utilized to improve performance (e.g., charge cycling), longevity and/or to prevent battery failure. In other examples, pressure relief mechanisms and structures can be applied in alternative systems, such as, for example, in any energy storage device or energy transformation device with a liquid component which may expand and/or contract during operation. Operation may include charging, discharging, heating, cooling or any other change in state of the device.

In an illustrative example, pressure relief mechanisms and structures are provided for a positive electrode, such as the positive liquid metal electrode 405 in FIG. 4. The positive liquid metal electrode 405 may experience an expansive pressure force during discharging. During discharging, the positive liquid metal electrode can function as a cathode, and the negative liquid metal electrode 403 can function as an anode. If the liquid cathode cannot freely expand as material is transferred from the anode during discharge (e.g., due to the formation of the solid layer 410 atop the liquid cathode), internal pressure can build. This can result in undesirable morphologies (such as bowing described herein) and/or sudden, uncontrolled pressure-induced punctures or cracks that can inhibit cell operability.

Pressure relief mechanisms disclosed herein provide one or more unobstructed physical spaces (also "chambers" herein) where the liquid cathode can freely expand and contract during cycling, thus relieving pressure. Thus, the disclosure provides a mechanism for reversibly relieving internal fluid pressure.

Figure 5:
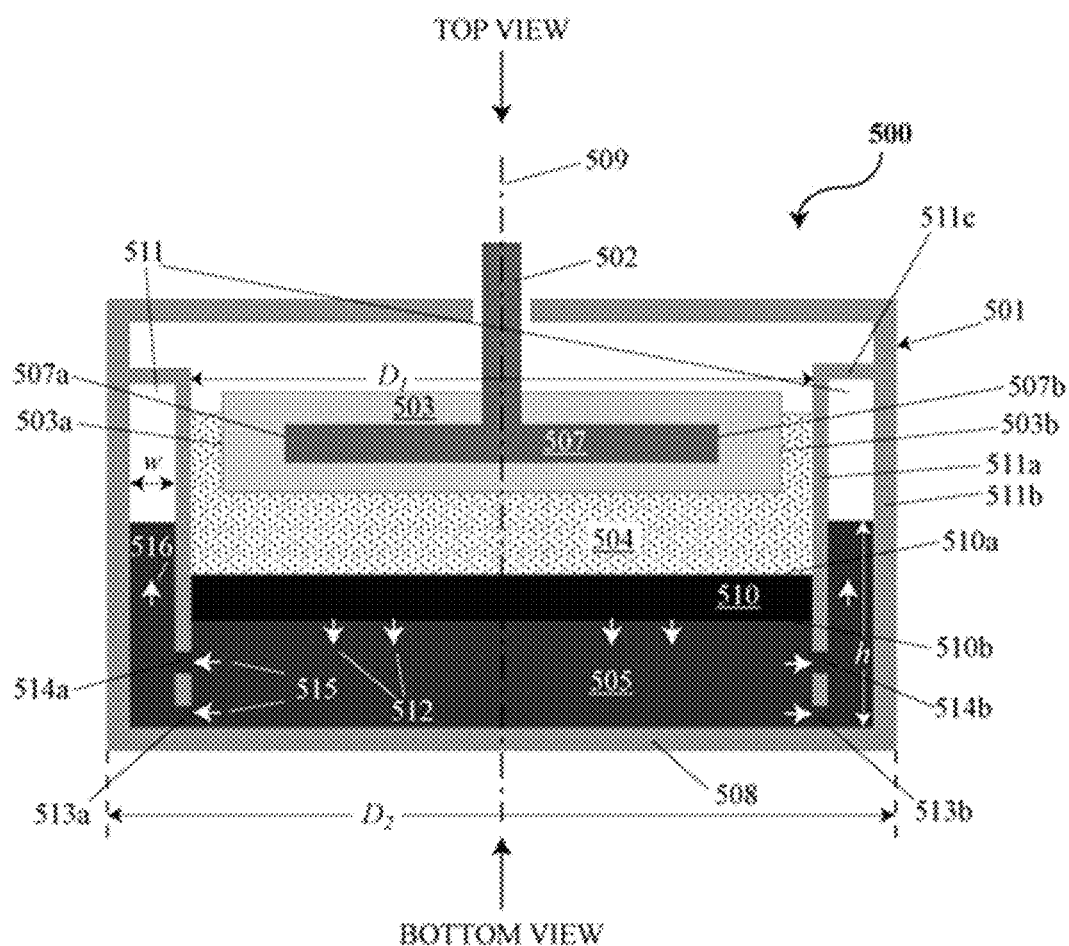
FIG. 5 is a cross-sectional side view of an electrochemical cell or battery with a pressure relief structure.

FIG. 5 is a cross-sectional side view of an electrochemical cell or battery 500 with a pressure relief structure 511. In an example, the battery cell 500 can have an axially symmetric, circular cross-section when viewed from above ("top view" in FIG. 5). The housing 501 can have concentric walls 511a, 511b. A first chamber or cavity can include a negative liquid metal electrode 503, a negative current collector 507, a liquid metal electrolyte 504, a positive liquid metal electrode 505 and a positive current collector 508. During discharge, a solid intermetallic layer 510 may form, as described elsewhere herein. The pressure relief structure 511 forms a second chamber. The walls of the first and second chambers can form the concentric walls of the housing 501 which may include a container, as described elsewhere herein. Thus, the pressure relief structure 511 is provided in the annular chamber (also referred to as "riser pipe" herein) defined by the concentric walls. In some cases, the concentric walls of the housing may be integrally formed. Alternatively, the concentric walls may be formed separately and mechanically joined, e.g., by welding. The housing and/or the walls can be formed of any materials for housings/containers described herein.

During discharge, the negative liquid metal electrode 503 can be an anode and the positive liquid metal electrode 505 can be a cathode. The intermetallic layer 510 includes an upper interface 510a and a lower interface 510b. As the lower interface 510b of the intermetallic layer 510 moves in a downward direction indicated by arrows 512, the liquid material of the cathode 505 is compressed. When pressure builds due to active electrochemistry in the first chamber space, the cathode material can rise between the walls 511a, 511b of the pressure relief structure 511 via one or more openings 513a, 513b, 514a, 514b. The openings can be provided adjacent to the housing 501 (e.g., openings 513a, 513b) such that the inner wall 511a of the pressure relief structure is not in contact with the bottom wall of the housing 501. In some examples, the bottom wall can be the positive current collector 508. The openings can also be provided at some predetermined distance from the bottom wall of the housing 501 (e.g., openings 514a, 514b). For example, the inner wall 511a can be attached to the bottom wall of the housing and only have openings 514a, 514b.

The holes may be circular or of any other shape allowing the cathode material to flow through the holes. For example, circular holes may be preferred to minimize drag on the flowing cathode material. The cathode material may flow through the holes as indicated by arrows 515, and upward in the pressure relief structure as indicated by arrows 516.

Combinations and/or a plurality of openings 513a, 513b, 514a, 514b can be provided along the inner wall of the annular pressure relief chamber 511. The holes may be provided at different axial distances from the bottom wall of the housing and may be of varying size. For example, the holes may be spaced to prevent the intermetallic layer 510 from "bottoming out", i.e., from reaching the uppermost level of the holes (which may be near the bottom of the first chamber), and blocking the riser pipe inlet (the area around arrows 515).

The pressure relief structure can have a top wall 511c. The top wall 511c can close the pressure relief structure to prevent material inside the riser pipe from spilling over the top of the riser pipe. In some cases, the wall 511b may be formed separately from the housing. For example, the walls 511a, 511b, and 511c can be integrally formed as an annular tube with a closed top and an open bottom (e.g., openings 513a, 513b), or as an annular tube with closed top and bottom but with perforations or holes near the bottom (e.g., openings 514a, 514b). In some examples, one or more parts or all of the pressure relief structure may be formed of one or more materials different than the housing 501. One or more parts or all of the pressure relief structure may be formed of an electrically insulating material, such as the electrically insulating materials described elsewhere herein.

With continued reference to FIG. 5, the cathode material in the riser pipe is not in contact with to the electrolyte 504. Further, the cathode material is electrically isolated from the electrolyte and the anode. When the cathode material is electrically conductive (e.g., a liquid metal cathode material), the cathode material in the riser pipe (second chamber) can be electrically connected with the cathode material in the first chamber. In some cases, such as, for example, when an unsheathed housing is employed as described elsewhere herein, only the wall 511b may be electrically insulating; the walls 511b and 511c may be electrically conductive. The wall 511c may only be electrically conductive if it is to not contact the electrolyte at any point.

The cathode material may rise in the pressure relief structure 511 to a height h. The height h may vary around the circumference of the pressure relief structure. The height h can be related to the volume change of the cathode (i.e., the liquid and solid cathode materials 505 and intermetallic layer 510). For example, the cathode materials 505 and 510 can have a volume $V_1$ when charged, and a volume $V_2$ when discharged. The height h can be related to the volume difference $V_2$-$V_1$ and the cross-sectional area of the pressure relief structure. The annular pressure relief structure in FIG. 5 can have a width w, and an area related to w and the circumference of the annular structure. The dimensions of the pressure relief structure, e.g., w, may be such that the cathode material can easily enter and rise in the structure. For example, the pressure relief structure can be dimensioned to minimize capillary wicking effects, and to ensure that the cathode material experiences minimal drag forces. The pressure relief structure can be dimensioned to accommodate a predetermined amount of cathode material. For example, the pressure relief structure may be dimensioned to accommodate less than 10%, less than 25%, less than 50%, or less than 75% of maximum volume or mass of the cathode material or of the liquid cathode material.

In some cases, the addition of the riser pipe decreases the gap between a first negative electrode end 503a and an adjacent wall (e.g., the wall 511a in FIG. 5), which may contribute to enhanced side wall creep of the liquid cathode material. To prevent the cathode material from climbing the pressure relief structure 511 along the wall facing the first chamber and shorting to the anode from the sides (i.e., climbing upward in FIG. 5, parallel and on the opposite side of the wall 511a from the arrows 516), the pressure relief structure(s) may be isolated from the anode by a sheath (e.g., carbon or metal nitride or other sheath materials described herein) or coating of material (e.g., PVD or CVD coating of a high temperature material), which is not readily wet by the cathode material. In some cases, the material may provide a surface texture or chemistry that interacts with the intermetallic material, e.g., the intermetallic may easily slide along the surface.

Conversely, one or more parts of the pressure relief structure, e.g., the surfaces defining the chamber of the riser pipe, may be formed of and/or coated with a material that is readily wet by the cathode to ensure smooth flow of the cathode material in the riser pipe. The material can be inert. In some cases, the material may have desired reactivity with the cathode material. In some cases, the inlet and/or the openings 513a, 513b, 514a, 514b can be coated with a material that prevents the intermetallic from sliding into the riser pipe. The inlet and/or the openings 513a, 513b, 514a, 514b may be covered with a mesh. The inlet and/or the openings 513a, 513b, 514a, 514b may comprise one or more valves or valve-like features. For example, the inlet and/or the openings can be configured to allow flow into the riser pipe above a certain hydraulic pressure value (e.g., during discharging), and to allow flow from the riser pipe into the first chamber (e.g., during charging) at a relatively lower pressure.

Alternative configurations of the pressure relief mechanism may include external pressure relief structures, such as, for example, a riser pipe mounted externally to the housing 501 and in fluid communication with the first chamber via one or more the openings 513a, 513b, 514a, 514b, ducts or connectors. Further examples of pressure relief structures include a shelf with an enlarged area for the intermetallic to grow (FIG. 6A), mechanical crumple zones which can contract and expand as an accordion (FIG. 6B), and a cell design including flexibility or "give" of the cell body or housing.

Figure 6A:
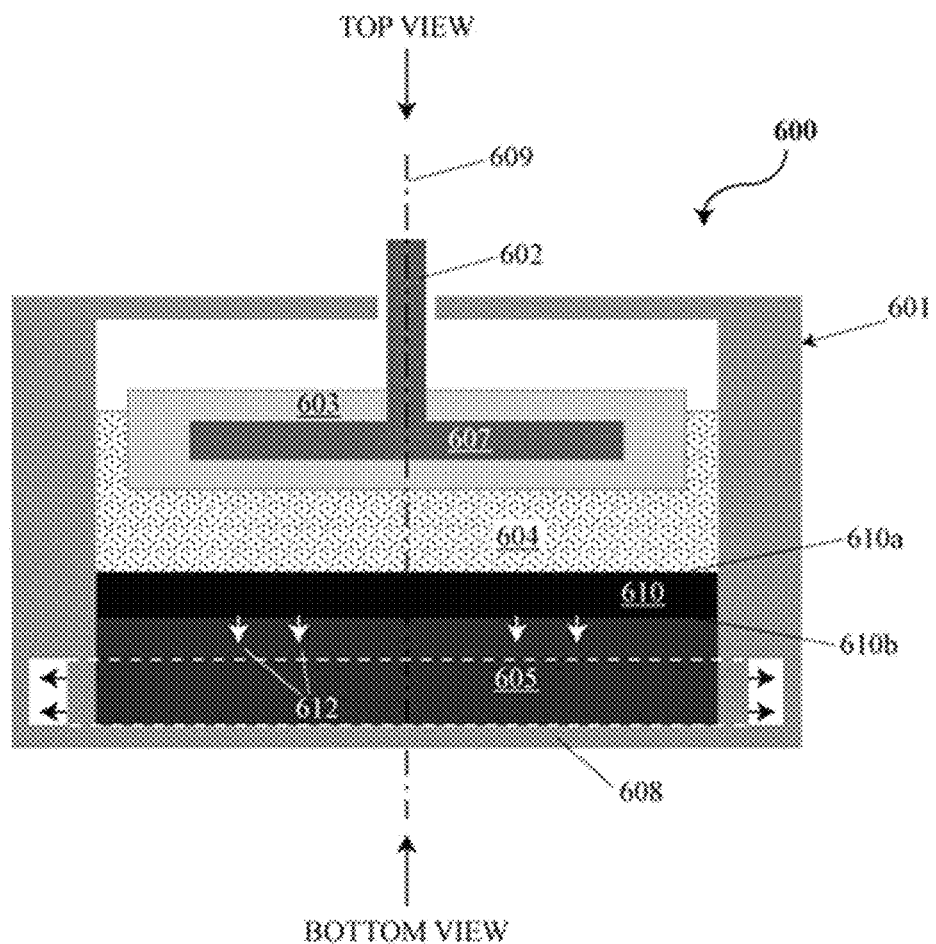
FIGS. 6A and 6B are cross-sectional side and bottom views of electrochemical cells or batteries with alternative pressure relief structures.

With reference to FIG. 6A, an electrochemical cell or battery 600 comprises a housing 601, a conductive feed-through (i.e., conductor, such as a conductor rod) 602 that passes through an aperture in the housing 601 and is in electrical communication with a liquid metal negative electrode 603. The cell 600 further comprises a liquid metal positive electrode 605, and a liquid metal electrolyte 604 between the electrodes 603, 605. The cell comprises a negative current collector 607 and a positive current collector 608 that are in electrical communication with the negative electrode 603 and positive electrode 605, respectively. During discharge of the cell 600, a solid (or semi-solid) intermetallic layer 610 forms adjacent to the positive electrode 605. The intermetallic layer can develop by growing horizontally along an interface of the electrolyte 604 and the positive electrode 605. The expansion may be axially symmetrical or asymmetrical with respect to an axis of symmetry 609. The electrolyte 604 and intermetallic layer 610 meet at a first interface 610a, and the intermetallic layer 610 and the positive electrode 605 meet at a second interface 610b. During discharge of the cell 600, the intermetallic layer 610 can bow, distort or move along a direction indicated by arrows 612. The housing 601 can include a shelf or cavity to house the intermetallic layer 610 upon growth of the intermetallic layer 610 during discharge of the cell 600. The cavity can be aligned with a bottom portion of the housing 601 (as shown). The cavity can include a wall portion that expands into a void space (white dashed lines) when there is a build-up of pressure in the positive electrode 605. The wall portion can be spring loaded, for example, to (1) provide a resistive force to prevent the wall portion from expanding if the pressure in the positive electrode 605 is below a given pressure, (2) enable the wall portion to expand the pressure in the positive electrode 605 is at or above the given pressure, and (3) provide a restorative force to return the wall portion to its original position when the pressure in the positive electrode 605 has decreased to below the given pressure. As an alternative, the cavity can be aligned with an interface between the electrolyte 604 and the cathode 605.

Figure 6B:
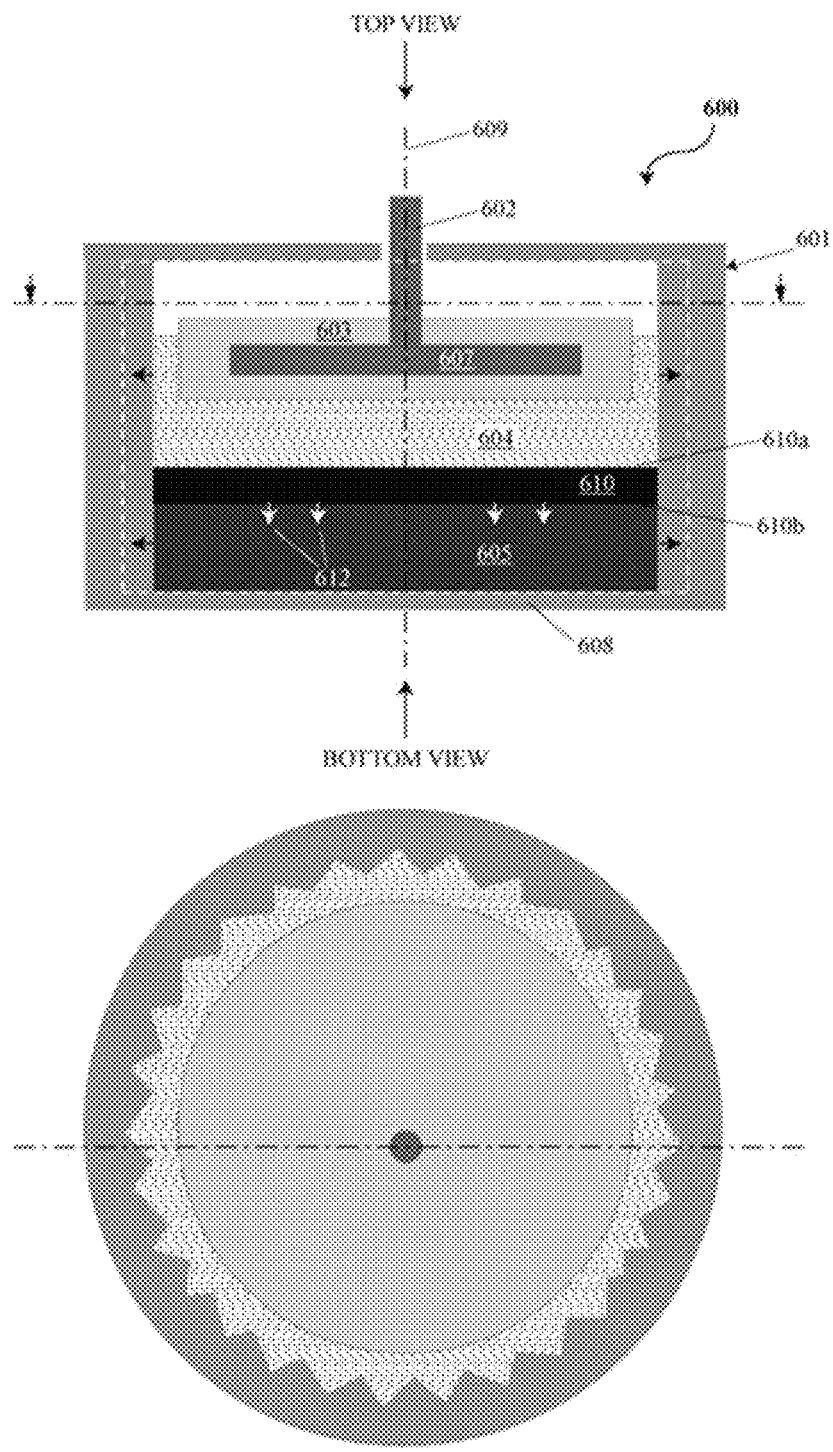

With reference to FIG. 6B, in an alternative configuration, the housing 601 includes mechanical crumple zones (dashed lines) that can expand and contract upon growth and shrinkage of the intermetallic layer 610 during discharge and charge, respectively, of the cell 600. The crumple zones can include voids that enable the electrodes 603, 605 and electrolyte 604 to flow into upon expansion of the electrodes 603, 605 and electrolyte 604.

Pressure relief can be readily applied to cells or batteries of various size scales. In an example, the annular riser pipe in FIG. 5 is implemented in a nominal 4 inch, nominal 20 Ah cell (D1=2.75 inches, w=6 mm wide, D1+w=3.03 inches, D2=3.5 inches) with Li∥Sb,Pb chemistry with a negative liquid metal electrode (anode during discharge) comprising 9.5 grams of Li, a positive liquid metal electrode (cathode during discharge) comprising 361.5 grams of 40:60 mol % Sb:Pb, a liquid metal electrolyte comprising 219.5 grams of 22:31:47 mol % LiF:LiCl:LiBr, and a solid intermetallic layer comprising $Li_3Sb$ formed at an interface of the liquid metal electrolyte and the positive liquid metal electrode during discharge. The liquid Pb alloy is allowed to "rise up" into the annular riser pipe as a result of expansion of the positive liquid metal electrode due to a pressure buildup. The concentric wall design is effective at relieving cathode pressure, and the amount of material between the walls is consistent with the volume expansion expected from Li alloying with Sb:Pb. Analogously, during charging, the material in the riser pipe can reversibly contract from the riser pipe. Other examples of cell sizes include, for example, a nominal 16 inch cell.

Mechanical Modification of Intermetallic Shape and Morphology

In another aspect of the disclosure, mechanical modifications of electrochemical cells (or batteries) are provided. The mechanical modifications can be applied, for example, in liquid metal batteries described herein. Examples include application of the mechanical modifications to positive battery electrodes in liquid metal batteries, e.g., for controlling interfaces during battery discharging, when the positive battery electrode functions as a cathode. The mechanical modifications may be utilized to improve battery performance (e.g., charge cycling), battery longevity and/or to prevent certain battery failure modes. In other examples, mechanical modifications can be applied in alternative systems, such as, for example, in any energy storage device or energy transformation device with multiple phases (e.g., between a liquid and a solid) and phase interfaces which, wherein the phases and phase interfaces may be formed and/or transformed during operation. Operation may include charging, discharging, heating, cooling or any other change in state of the device.

In an example, mechanical modifications are provided for a positive electrode, such as the positive liquid metal electrode 405 in FIG. 4. During discharging, the positive liquid metal electrode can function as a cathode, and the negative liquid metal electrode 403 can function as an anode. As described elsewhere herein, the solid layer 410 may form atop the liquid cathode during discharge, and pressure forces from the liquid metal cathode and/or internal stresses in the layer itself may cause undesirable morphologies of the solid layer 410, e.g., bowing or bulging of the solid layer, and/or sudden, uncontrolled pressure-induced cracks that can inhibit cell operability.

Figure 7A:
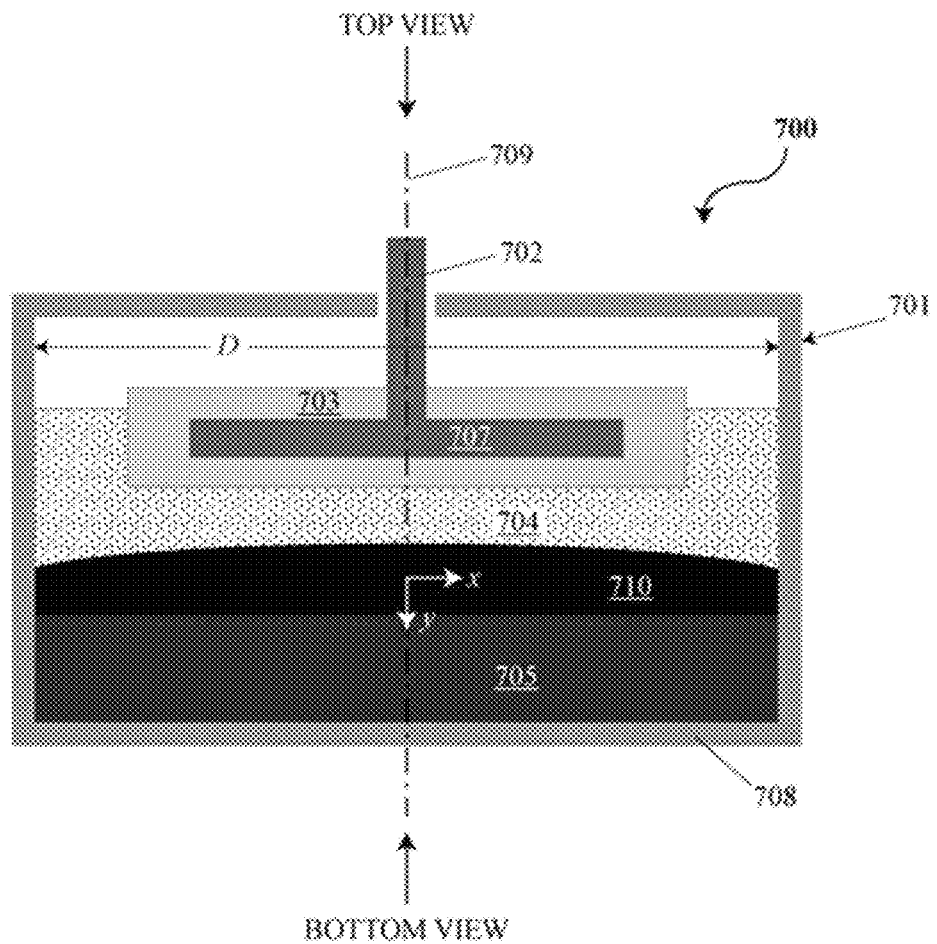
FIG. 7A is a cross-sectional side view of an electrochemical cell or battery with a bowing or bulging solid intermetallic layer.

FIG. 7A a cross-sectional side view of an electrochemical cell 700 with a bowing or bulging solid intermetallic layer 710 formed adjacent to a positive liquid metal electrode 705 during discharging, as described elsewhere herein. In an example, the battery cell 700 can have an axially symmetric, circular cross-section when viewed from above ("top view" in FIG. 7A). The battery cell can comprise a negative liquid metal electrode 703, a negative current collector 707, a liquid metal electrolyte 704, the positive liquid metal electrode 705 and a positive current collector 708. Uncontrolled and unintended formation of the intermetallic layer 710 may cause failure of electrochemical cells or batteries (e.g., liquid metal battery cells with chemistries such as Li∥Sb,Pb), because the intermetallic solid can grow into structures that form a short between a negative liquid metal electrode 703 and/or a negative current collector 707 and the positive liquid metal electrode 705. During discharge, the negative liquid metal electrode 703 can be an anode and the positive liquid metal electrode 705 can be a cathode.

The cathode morphology may depend on the size of the cell or battery 700. In smaller cells (e.g., a nominal 4 inch liquid metal battery cell with Li∥Sb,Pb chemistry), the cathode morphology may include an bulged (bowed) intermetallic layer with a maximum height at or near the center of the cell, as shown in FIG. 7A. The liquid metal cathode 705 can fill cell cavity below the arc (i.e., between the intermetallic layer 710, and the bottom wall of the housing 701 and/or the positive current collector 708). In larger cells, the intermetallic layer may develop irregular undulations with several height maxima distributed over an active surface or interface (e.g., the interface between the electrolyte 704 and the liquid metal cathode 705) of the cell. In some cases, these undulating morphologies may be problematic during cell operation, because the crests of the undulating cathode (i.e., the undulating intermetallic layer of the cathode) can contact the anode 703 and/or the negative current collector 707, which can irreversibly short a cell. In some examples, the troughs of the undulating features appear to be pinned at the sidewalls of the cell (i.e., at the sidewalls of the housing 701). In one example, the cathode morphology in a nominal 1 inch liquid metal battery cell with Li∥Sb,Pb chemistry can be relatively flat and controlled, while deviation from flatness can increase with increasing cell size.

Figure 7B:
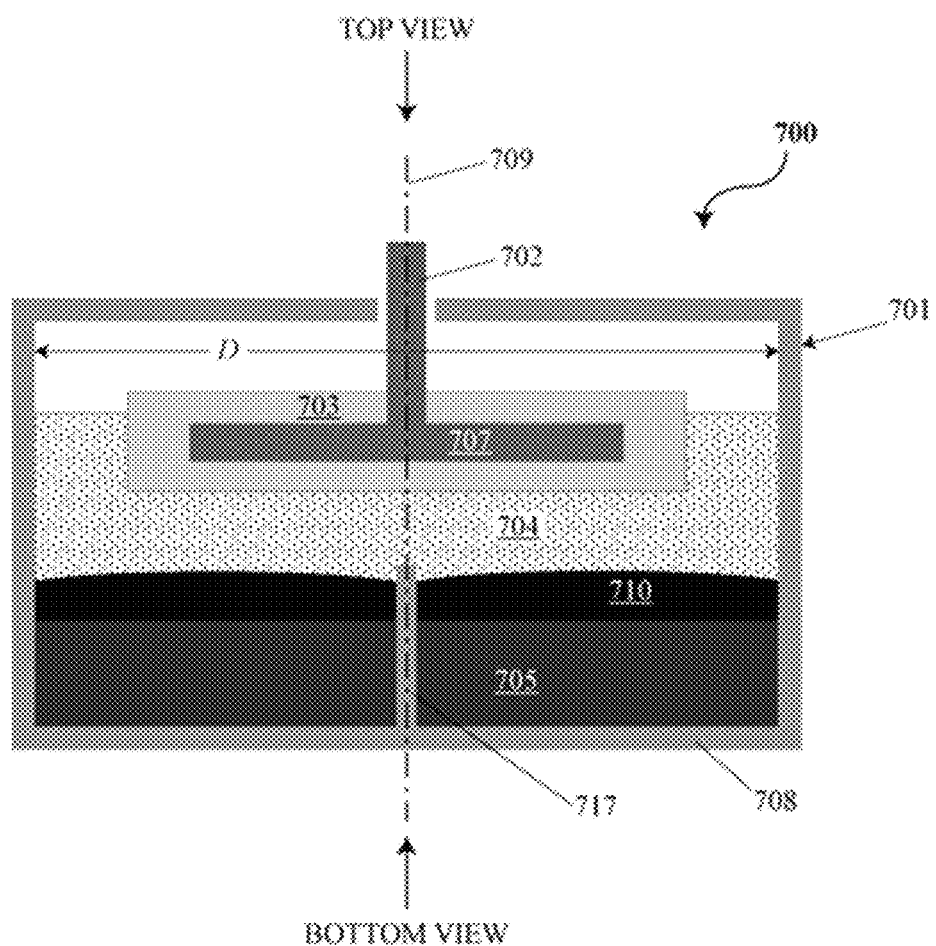
FIG. 7B is a cross-sectional side view of the electrochemical cell or battery with a post.

FIG. 7B is a cross-sectional side view of the electrochemical cell or battery 700 outfitted with a mechanical modification, such as a post 717. The added mechanical modification (e.g., an appropriate physical protrusion) may interact with the cathode-intermetallic interface (including the intermetallic), thereby modifying the cathode-intermetallic morphology into a form more amenable to extended cell operation (e.g., encouraging a more flat, uniform intermetallic layer) by introducing additional pin or "attachment points" in addition to the sidewalls of the housing. Thus, the intermetallic can be allowed to form, but the shape or geometry can be disrupted such that the formed intermetallic layer is flatter (e.g., by forming smaller bulges or undulations). For example, the intermetallic can be forced to form smaller and lower bulging features (FIG. 7B) between attachment points instead of the single feature across an entire width, diameter or other characteristic dimension D of the cell (FIG. 7A). The presence of one or more disruptors or an array of disruptors may furthermore affect the thickness of the intermetallic layer and/or location of the height maxima. For example, a height maximum may not occur symmetrically between attachment points, and may depend on the type of attachment point (e.g., the location of a height maximum between a wall attachment point and a post attachment point may be skewed toward one of the two attachment points). In some cases, a complicated morphology of the intermetallic layer may result from the use of a set or an array of attachment points. In another example, the intermetallic layer may be thinner near an attachment point, or the thickness may depend on the type of attachment point.

One or more mechanical modifications (also "disruptors" or "intermetallic disruptors" herein) may be provided in the cell or battery 700, including, but not limited to, one or more vertical posts, an array of vertical posts (e.g., two, three or more posts 717, a bed of nails), one or more plates, a grid of interleaved plates configured to form compartments on the cathode (e.g., egg carton-like or grid-like structure), one or more structural pieces, an array of structural pieces (e.g., an array of angled iron pieces lying on their side on the cell bottom), stamped structures (e.g., stamped ridges) and/or other mechanical disruptor type or configuration capable of mechanically interfering with the growth of the intermetallic layer to enable managing the cathode morphology during cycling. In some cases, one or more features may be provided elsewhere within the cell 700 that are complementary to a particular cathode disruptor configuration or to a cell morphology that results from a particular cathode disruptor configuration. For example, if a stamped ridge configuration or an array of posts is used on the cathode, giving rise to a particular wave-like pattern, the negative current collector 707 may be formed with a similar wave-like pattern such that the distance between any point on an upper surface of the intermetallic layer 710 and a vertically opposite (i.e., at the same position x) point on the negative current collector 707 remains approximately constant across the cell.

Figure 7C:
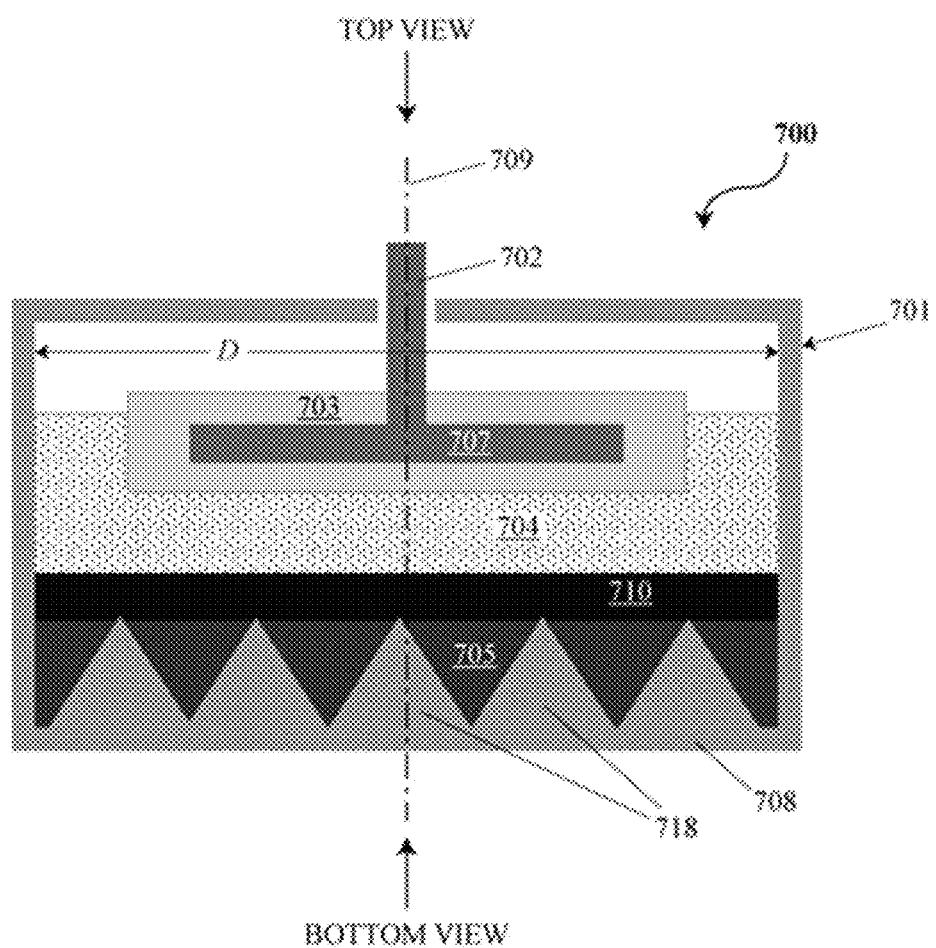
FIG. 7C is a cross-sectional side view of the electrochemical cell or battery with ridges.

FIG. 7C is a cross-sectional side view of the electrochemical cell or battery 700 outfitted with ridges 718, another example of a mechanical modification of the cathode. Although a flat layer is shown, the intermetallic layer may have a morphology determined by the ridge structure. The disruptors may be formed of any suitable material including, but not limited to, materials suitable for housings/containers, current collectors, sheaths, or any other features of the disclosure. Individual disruptors and/or disruptor types may or may not be formed of the same material(s). The disruptors may be provided together with one or more components of cell 700. For example, the disruptors may be provided on bottom wall of the housing 701 and/or on the positive current collector 708. One or more disruptor features may be integrated with one or more cell components, while one or more other disruptor features may be integrated with another one or more cell components. The disruptor features or parts thereof may be formed separately and subsequently attached to one or more cell components. Alternatively, the disruptor features or parts thereof may be integrally formed with one or more cell components. For example, ridges may be stamped into the positive current collector 708, and an additional disruptor grid may be attached to or contacted with the modified positive current collector, thus forming a composite disruptor configuration. In another example, a first portion of a single type of disruptor may be integrally formed with the housing 701, while a second portion may be attached to the first portion during cell assembly. Any combination of disruptor material, formation or assembly can be used. Furthermore, mechanical modification can be advantageously incorporated into an existing cell manufacturing process. For example, ridges or posts can be introduced during stamping or hydroforming of a cell bottom. In another example, the attachment and welding of posts can be automated or achieved using a robot.

Individual disruptor features (e.g., individual posts) may be spaced apart in a predetermined pattern. For example, a spacing between individual disruptor features in array can be determined to achieve a predetermined maximum height and/or a predetermined pattern of the intermetallic layer. Once an appropriate spacing is determined, the array spacing may be scaled between different cell geometries. For example, the same spacing can be used, or the spacing can be scaled by cell diameter or width, cell area, etc. In some cases, array spacing can be scaled according to current density and/or other cell operating parameters. The disruptor features may be spaced apart uniformly, or stochastically. The disruptor features may be spaced apart to achieve a desired surface density of disruptor features (e.g., an average surface density of 1.5 posts per square centimeter of the bottom surface of the housing 701).

In an example, the disruptor of FIG. 7B is implemented in a nominal 4 inch, nominal 20 Ah cell (D1=2.75 inches, w=6 mm wide, D1+w=3.03 inches, D2=3.5 inches) with Li∥Sb, Pb chemistry with a negative liquid metal electrode (anode during discharge) comprising 15.8 grams of Li, a positive liquid metal electrode (cathode during discharge) comprising 480.3 grams of 40:60 mol % Sb:Pb, a liquid metal electrolyte comprising 300.2 grams of 22:31:47 mol % LiF:LiCl:LiBr, and a solid intermetallic layer comprising $Li_3Sb$ formed at an interface of the liquid metal electrolyte and the positive liquid metal electrode during discharge. In a discharged state, the Li∥Sb,Pb cell can have a intermetallic phase and a metallic Sb,Pb alloy. In experiments with a centered steel post design and an off-center steel post design, the peak of the intermetallic layer is translated from the center of the cell as a result of the presence of the post. In the case of the off-center post design, the maximum height of the bulging intermetallic layer can be shifted in the direction of the post, and the intermetallic layer can be thinnest near the post. An array of vertical posts extending from the cell bottom and a grid of interleaved metal plates, producing several compartments in the cell bottom similar to an egg carton have also been tested. Other examples of cell sizes include, for example, a nominal 16 inch cell.

Aspects of the disclosure may be synergistically combined. For example, a pressure relief mechanism can be used in concert with other intermetallic management strategies, such as the use of mechanical disruptors described herein. The pressure relief mechanism may enhance the performance of the disruptors by reducing the tendency of cathode material to be forced through induced defects in the intermetallic layer. For example, in Li∥Sb,Pb systems, the use of disruptors alone may cause defects in the solid intermetallic layer that do not result in a controlled pressure release, causing liquid cathode material to break through the defects with substantial force. The resulting upward motion of liquid cathode material can be a limiting factor to cell operability and lifespan. The use of pressure relief mechanisms of the disclosure may alleviate the pressure buildup and enable improved (or modified) disruptor performance. For example, smaller and/or otherwise distributed disruptors may be used during operation with lesser pressure buildup.

Any aspects of the disclosure described in relation to cathodes may equally apply to anodes at least in some configurations. Similarly, one or more battery electrodes and/or the electrolyte may not be liquid in alternative configurations. In an example, the electrolyte can be a polymer or a gel. In a further example, at least one battery electrode can be a solid or a gel. Furthermore, in some examples, the electrodes and/or electrolyte may not include metal. Aspects of the disclosure are applicable to a variety of energy storage/transformation devices without being limited to liquid metal batteries.

Electrochemical cells of the disclosure may be capable of storing (and/or taking in) a suitably large amount of energy. In some instances, a cell is capable of storing (and/or taking in) about 1 Wh, about 5 Wh, 25 Wh, about 50 Wh, about 100 Wh, about 500 Wh, about 1 kWh, about 1.5 kWh, about 2 kWh, about 3 kWh, or about 5 kWh. In some instances, the battery is capable of storing (and/or taking in) at least about 1 Wh, at least about 5 Wh, at least about 25 Wh, at least about 50 Wh, at least about 100 Wh, at least about 500 Wh, at least about 1 kWh, at least about 1.5 kWh, at least about 2 kWh, at least about 3 kWh, or at least about 5 kWh. It is recognized that the amount of energy stored in an electrochemical cell and/or battery may be less than the amount of energy taken into the electrochemical cell and/or battery (e.g., due to inefficiencies and losses).

The compilation of cells (i.e., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

Batteries of the disclosure may be capable of storing a suitably large amount of energy for use with a power grid (i.e., a grid-scale battery) or other loads or uses. In some instances, a battery is capable of storing (and/or taking in) about 5 kWh, 25 kWh, about 50 kWh, about 100 kWh, about 500 kWh, about 1 MWh, about 1.5 MWh, about 2 MWh, about 3 MWh, or about 5 MWh. In some instances, the battery is capable of storing (and/or taking in) at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, or at least about 5 MWh.

In some instances, the cells and cell housings are stackable. Any suitable number of cells can be stacked. Cells can be stacked side-by-side, on top of each other, or both. In some instances, at least about 10, 50, 100, or 500 cells are stacked. In some cases, a stack of 100 cells is capable of storing at least 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100, or more electrochemical cells.

The electrochemical cells can be arranged in series and/or parallel to form an electrochemical energy storage system (i.e., battery). The energy storage system can comprise modules, packs, cores, and/or pods of electrochemical cells surrounded by a frame.

Figure 8:
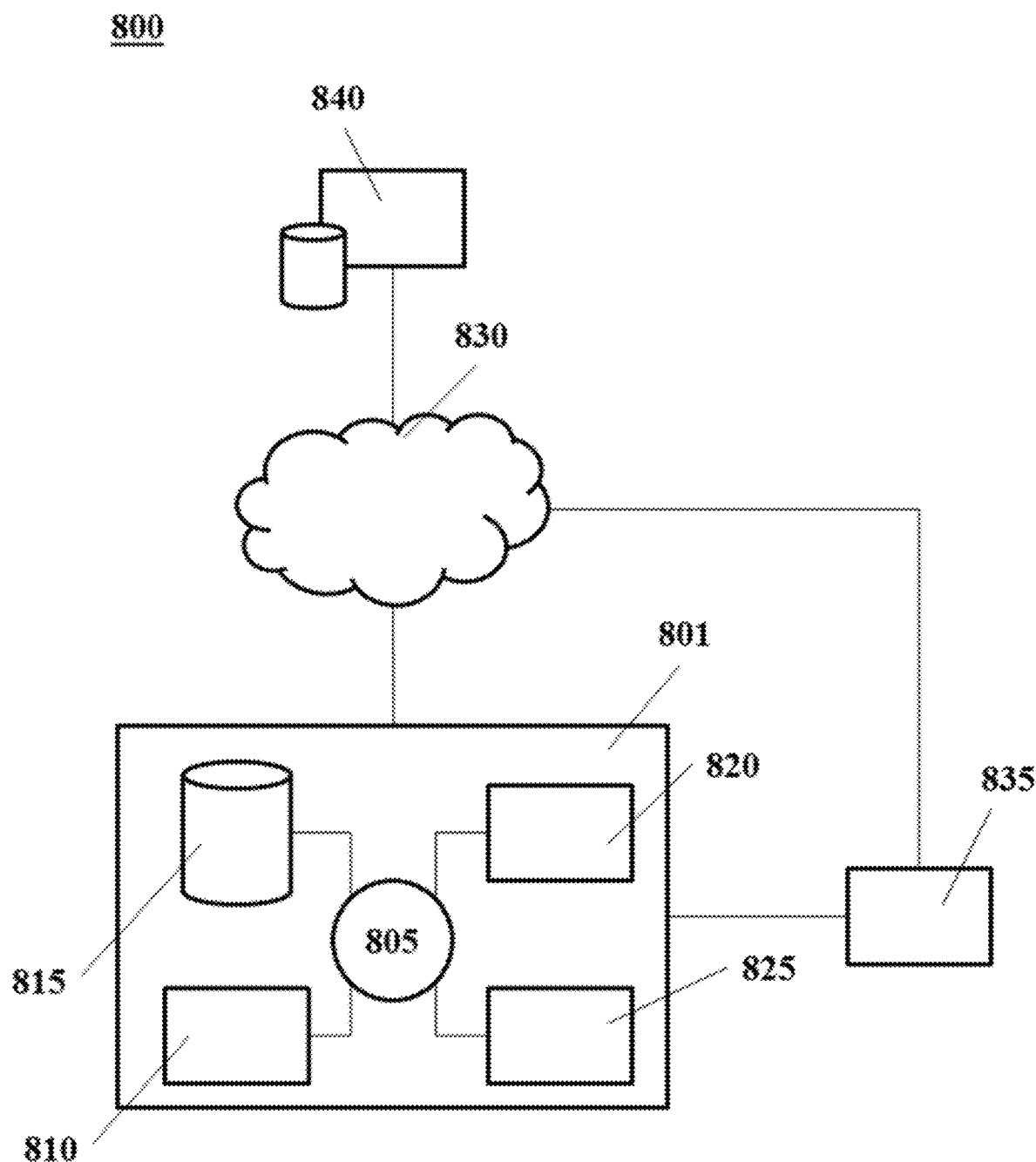
FIG. 8 is an illustration of a computer system.

Another aspect of the present disclosure provides a system that is programmed or otherwise configured to implement the methods of the disclosure. FIG. 8 shows a system 800 programmed or otherwise configured to one or more process parameters of an energy storage system. The system 800 includes a computer server ("server") 801 that is programmed to implement methods disclosed herein. The server 801 includes a central processing unit (CPU, also "processor" and "computer processor" herein) 805, which can be a single core or multi core processor, or a plurality of processors for parallel processing. The server 801 also includes memory 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The server 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the server 801, can implement a peer-to-peer network, which may enable devices coupled to the server 801 to behave as a client or a server. The server 801 can be coupled to an energy storage system 835 either directly or through the network 830.

The storage unit 815 can store process parameters of the energy storage system 835. The server 801 in some cases can include one or more additional data storage units that are external to the server 801, such as located on a remote server that is in communication with the server 801 through an intranet or the Internet.

The server 801 can communicate with one or more remote computer systems through the network 830. In the illustrated example, the server 801 is in communication with a remote computer system 840. The remote computer system 840 can be, for example, a personal computers (e.g., portable PC), slate or tablet PC (e.g., Apple® iPad, Samsung® Galaxy Tab), telephone, Smart phone (e.g., Apple® iPhone, Android-enabled device, Blackberry®), or personal digital assistant.

In some situations, the system 800 includes a single server 801. In other situations, the system 800 includes multiple servers in communication with one another through an intranet and/or the Internet.

Methods as described herein can be implemented by way of machine (or computer processor) executable code (or software) stored on an electronic storage location of the server 801, such as, for example, on the memory 810 or electronic storage unit 815. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810. Alternatively, the code can be executed on the second computer system 840.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the server 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Various parameters of an energy storage system can be presented to a user on a user interface (UI) of an electronic device of the user. Examples of UI's include, without limitation, a graphical user interface (GUI) and web-based user interface. The UI (e.g., GUI) can be provided on a display of an electronic device of the user. The display can be a capacitive or resistive touch display. Such displays can be used with other systems and methods of the disclosure.

Methods of the disclosure can be facilitated with the aid of applications (apps) that can be installed on electronic devices of a user. An app can include a GUI on a display of the electronic device of the user. The app can be programmed or otherwise configured to perform various functions of the system.

Methods for Transporting Energy Storage Systems

Another aspect of the present disclosure provides methods for transporting energy storage systems. In some cases, the energy storage devices are transported with molten metal electrodes (e.g., at a high temperature of at least 250° C., at least 400° C., at least 500° C., or at least 600° C.). The energy storage devices can also be transported at ambient temperature (e.g., with the electrodes being solid and not molten) and heated at the site of operation to melt the metal electrodes.

Figure 9:
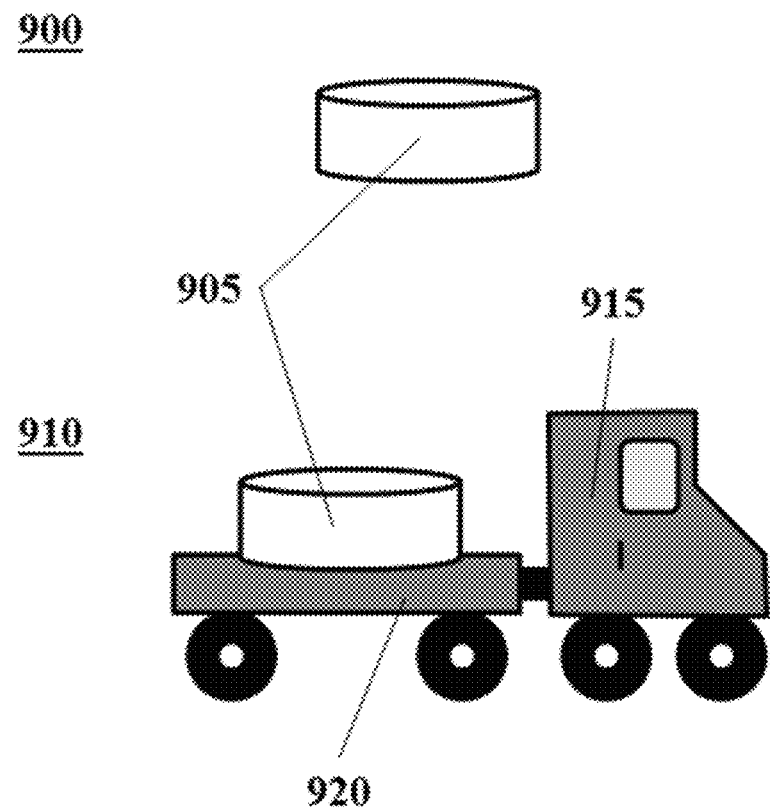
FIG. 9 is an illustration of an electrochemical energy storage device being transported on a truck.
Figure 9:
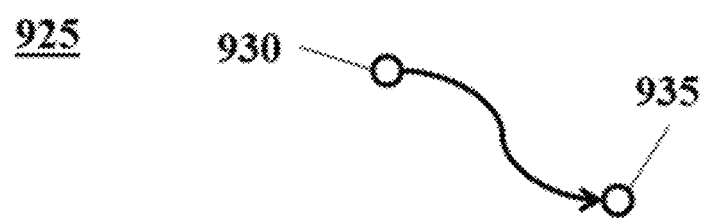

The energy storage devices can be transported in any suitable manner including fully assembled or in pieces to be assembled at the site of operation. The energy storage devices can be transported on any suitable vehicle, such as a truck (including on a trailer pulled by a truck), on a train, on a ship, on an airplane, on a helicopter, by a robot, and the like. FIG. 9 shows an energy storage device 905 that is assembled 900 and placed on a vehicle 910. In this case the vehicle includes a truck 915 and a trailer 920 pulled by the truck. The vehicle can transport the energy storage device 925 from an initial location 930 to a site of installation and/or operation 935 along any suitable path (e.g., along roads, railroad tracks, shipping routes and the like).

The energy storage devices can be transported any distance such as at least about 1 mile, at least about 10 miles, at least about 100 miles, at least about 1,000 miles or at least about 10,000 miles. The energy storage devices can be transported at any speed including at least about 5 miles per hour (mph), at least about 10 mph, at least about 20 mph, at least about 40 mph, at least about 60 mph, at least about 150 mph, or at least about 500 mph.

An energy storage device of the present disclosure, including an electrochemical cell ("cell") of the energy storage device, can be configured for transport. In some cases, the cell does not have a voltage and cannot pass current while being transported (e.g., on a truck at room temperature). The cell may not have an appreciable or detectable voltage during transport, and the cell may not pass an appreciable or detectable current during transport. This can be advantageous since the cells are electrically inert and cannot short.

An electrochemical cell can comprise chemical components that generate a potential difference when a system comprising the cell is heated (e.g., to approximately 250° C. or 450° C. or 500° C.). While at room temperature, the electrolyte in the cell can be solid and/or incapable of conducting ions necessary to facilitate either the charge of discharge reactions. The system does not pass current (e.g., even if the electrode terminals are shorted), and does not have an inherent cell voltage. When the temperature is elevated, the non-aqueous (non water based) electrolyte melts and/or becomes an ionic conductor, thus enabling the cell to accept or provide current and charge or discharge. When at operating temperature and when the electrolyte is molten or ionically conductive and if the cell is above 0% state of charge, the battery can have a non-zero cell voltage of around 0.9 volts in some cases.

An advantage of a cell that does not exhibit a cell voltage and is unable to accept or supply current while at room temperature is that the safety risks associated with shipping batteries are reduced. Even in the event that the cells are jostled and are externally shorted, the cells do not discharge and cannot be charged.

In some cases, the system comprises a metallic crucible that acts as one electrode and a dielectrically separated region that forms the second electrode. At room temperature, the electrodes are physically separated by solid chemicals that are inert and do not inherently generate a potential between the two electrodes. As temperature is raised portions of the solid electrolyte can undergo a change in electrical characteristics (such as a phase transition) that results in a potential difference forming between the electrodes. When temperature is maintained at approximately this range, the system can be capable of sourcing (discharging) or sinking (recharging) current. When the temperature is brought back to room temperature, the chemical media can undergo another phase transition that brings potential difference to zero between the electrodes and also increases ionic resistance preventing flow of current.

Energy storage devices (or batteries) of the present disclosure can be reliably safe during transportation and handling from a pickup location to a delivery location. Physical short circuits or other externally induced abuse conditions (e.g., puncture, shock, vibration, etc.) have little to no effect on safety or operation of the system when these conditions are induced at room temperature.

An electrochemical energy storage device of the present disclosure (including a cell of the device) may not be capable of being charged, being discharged, or having an electrical potential during transport. This may be accomplished by transporting (or shipping) the energy storage device at a temperature that is reduced with respect to an operating temperature of the energy storage device.

For example, an electrochemical energy storage device can comprise an anode and a cathode, and an electrolyte between the anode and the cathode. The device may not be capable of conducting ions at a first temperature and capable of conducting ions at a second temperature. The first temperature may be maintained during transport of the electrochemical energy storage device.

The anode can comprise lithium, potassium, magnesium and/or calcium. The cathode can comprise antimony, tin, tellurium, bismuth and/or lead.

In some embodiments, at least part of the device is a solid at the first temperature and a liquid at the second temperature. The at least part of the device can be an electrolyte.

In some cases, the first temperature is room temperature. In some cases, the first temperature is less than about 100° C. In some cases, the second temperature is at least about 250° C. In some cases, the second temperature is at least about 500° C.

The device of the present disclosure may not be capable of being charged, being discharged, or having an electrical potential at the first temperature. In some instances, the device has a positive terminal and a negative terminal, and shorting the terminals does not discharge the device at the first temperature. In some cases, the device does not discharge when the device is punctured, vibrated, shorted, or shocked.

In another aspect of the present disclosure, an electrochemical energy storage device comprises a negative electrode and a positive electrode, and an electrolyte between the negative and positive electrodes. The device has a first potential difference between the electrodes at a first temperature of less than about 50° C. and a second potential difference between the electrodes at a second temperature of at least about 250° C. The second potential difference is greater than the first potential difference.

In some cases, the first potential difference is less than or equal to about 2.5 volts, 2 volts, 1.5 volts, 1.2 volts, 1 volt, 0.9 volts, 0.8 volts, 0.7 volts, 0.6 volts, 0.5 volts, 0.4 volts, 0.3 volts, 0.2 volts, 0.1 volts, or less. The first potential difference can be about 0 volts.

The second voltage can be greater than 0 volts, or greater than or equal to about 0.1 volts, 0.2 volts, 0.3 volts, 0.4 volts, 0.5 volts, 0.6 volts, 0.7 volts, 0.8 volts, 0.9 volts, 1 volt, 1.2 volts, 1.5 volts, 2 volts, or 2.5 volts.

The negative electrode can comprise lithium, potassium, magnesium and/or calcium. The positive electrode can comprise antinomy, tin, tellurium, bismuth and/or lead.

The electrochemical energy storage device of the present disclosure can be comprised in an array of energy storage devices as part of an energy storage system. In some cases, the electrochemical energy storage device is an energy storage cell, and the energy storage system comprises a plurality of energy storage cells.

The present disclosure provides methods for transporting energy storage devices, and installing the energy storage devices for use in an energy storage system. The energy storage system can be electrically coupled to a power source and a load, such as, for example, a power grid. The energy storage system can store energy from the power source for use with the load.

Figure 10:
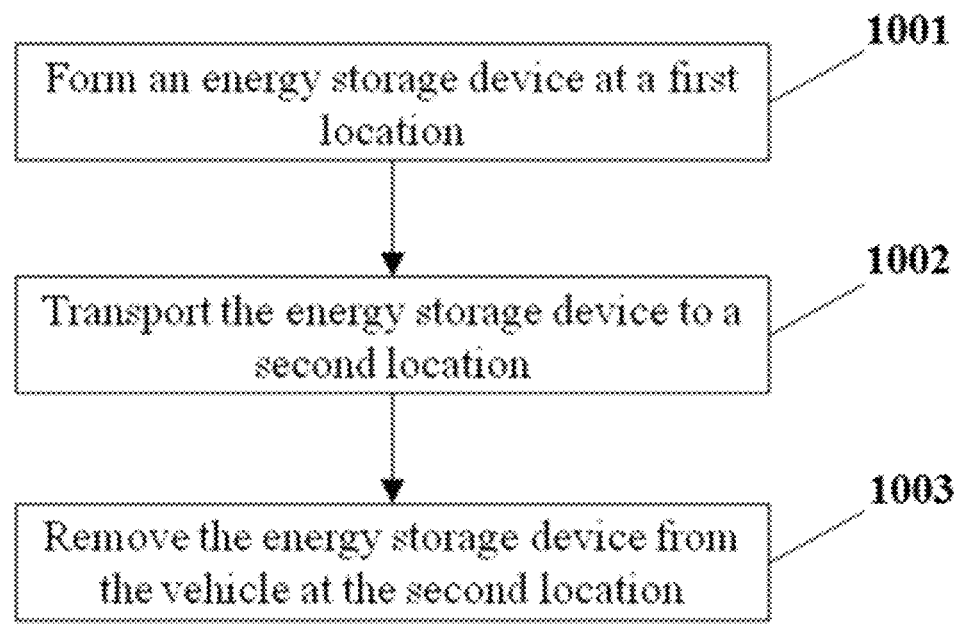
FIG. 10 illustrates a method for forming an energy storage system.

FIG. 10 illustrates a method 1000 for forming an energy storage system of the present disclosure. The method 1000 comprises, in a first operation 1001, forming, at a first location, an energy storage device comprising a negative electrode and a positive electrode, and an electrolyte between the negative electrode and the positive electrode, and placing the energy storage device on a vehicle (e.g., truck, train) that is configured to transport the energy storage device from the first location to a second location. The energy storage device can be as described elsewhere herein. For instance, the negative electrode, positive electrode and electrolyte can each be formed of a material that is in the liquid at an operating temperature of the energy storage device.

Next, in a second operation 1002, the method 1000 comprises using the vehicle to transport the energy storage device from the first location to the second location. Next, in a third operation 1003, at the second location the energy storage device can be removed from the vehicle. The energy storage device can be subsequently positioned at an installation location, and in some cases installed into the energy storage system at the installation location.

In some examples, the energy storage device can be electrically coupled to a power source. The power source can be selected from the group consisting of a power plant (e.g., nuclear power plant, coal-fired power plant, fuel-fired power plant), a wind turbine, a photovoltaic system, a geothermal system, and a wave energy system. The power source can be configured to generate power from a renewable energy source or non-renewable energy source.

The energy storage device of the present disclosure can be electrically coupled to a load, such as a power grid. The energy storage device can then be employed to deliver power to the load and/or store energy from the power source.

During transport, a potential difference between the positive electrode and the negative electrode can be less than about 1 volt, 0.9 volts, 0.8 volts, 0.7 volts, 0.6 volts, 0.5 volts, 0.4 volts, 0.3 volts, 0.2 volts, 0.1 volts, or less. In some examples, the potential difference can be about 0 volts. The potential difference can be less than 1 volt, 0.9 volts, 0.8 volts, 0.7 volts, 0.6 volts, 0.5 volts, 0.4 volts, 0.3 volts, 0.2 volts, 0.1 volts, or less (e.g., 0 volts) at a temperature ("transport temperature") that is less than the operating temperature of the energy storage device. The energy storage device can be transported with the energy storage device at the transport temperature.

Liquid Metal Electrochemical Energy Storage Devices

Electrochemical cells having molten electrodes having an alkali metal can provide receipt and delivery of power by transporting atoms of the alkali metal between electrode environments of disparate chemical potentials through an electrochemical pathway comprising a salt of the alkali metal. The chemical potential of the alkali metal is decreased when combined with one or more non-alkali metals, thus producing a voltage between an electrode comprising the molten alkali metal and the electrode comprising the combined alkali/non-alkali metals. Additional details of the batteries can be found in U.S. Patent Publication No. 2012/0104990, which is hereby incorporated by reference in its entirety.

In some cases, an electrochemical cell has three distinct phases. The first phase defines a positive electrode having at least one element other than an alkali metal. The second phase includes cations of the alkali metal, and defines two separate interfaces. The first phase is in contact with the second phase at one of the interfaces. The third phase defines a negative electrode and includes the alkali metal. It is separate from the first phase and in contact with the second phase at the other interface. The first and third phases have respective volumes which decrease or increase at the expense of one another during operation of the cell. As a result the second phase is displaced from a first position to a second position. The first, second, and third phases may be solid, liquid, or in a combination of solid or liquid states. In preferred embodiments, the alkali metal is present at respective disparate chemical potentials in the first and third phases, originating a voltage between the first and third phases.

An embodiment includes an electrochemical cell having two distinct phases. The first phase defines a positive electrode and includes an alkali metal, and two other elements other than the alkali metal. The second liquid phase includes cations of the alkali metal, and defines two separate interfaces. The first phase is in contact with the second phase at one of the interfaces. In some embodiments, the first and second phases are solid. In other embodiments, the first and second phases are liquid. In other embodiments, the phases are in a combination of solid or liquid states. The alkali metal preferably is selected to exhibit a change in chemical potential when combined with the first and second elements. During operation of the cell to deliver or draw electrical energy to drive transfer of the alkali metal to or from the second liquid phase to or from the first liquid phase, the first phase has a volume which increases or decreases thus transferring energy to or from the electrochemical cell to or from an external circuit. As a result the second phase is displaced from a first position to a second position.

In some cases, the two elements other than the alkali metal are independently selected from group IVA, VA and VIA elements of the chemical periodic table. In some embodiments, these elements are selected independently from one of tin, lead, bismuth, antimony, tellurium and selenium. In other embodiments, these elements are lead and antimony. The alkali metal may be sodium or lithium or potassium. The second phase may include refractory particles distributed throughout the second liquid phase. Moreover, the refractory particles may include a metal oxide or metal nitride, or combinations thereof.

The second phase can include a salt of the alkali metal. The salt of the alkali metal may be selected from one or more of halide, bistriflimide, fluorosulfano-amine, perchlorate, hexaflourophosphate, tetrafluoroborate, carbonate or hydroxide.

In some instances, a method stores electrical energy transferred from an external circuit. To that end, the method provides at least one electrochemical cell having three liquid phases. The first liquid phase defines a positive electrode and includes at least one element other than an alkali metal. The second liquid phase includes cations of the alkali metal, and defines two separate interfaces. The first phase is in contact with the second phase at one of the interfaces. The third liquid phase defines a negative electrode and includes the alkali metal. It is separate from the first phase and in contact with the second phase at the other interface. The electrochemical cell is configured to connect with the external circuit. The external circuit is electrically connected to a negative pole and a positive pole of electrochemical cell. The external circuit is operated which drives electrical energy that drives transfer of the alkali metal to or from the first liquid phase, through the second liquid phase, and to or from the third liquid phase. The first phase has a volume which decreases or increases while the third phase has a volume which decreases or increases respectively thus transferring energy to and from the external circuit to the electrochemical cell. As a result the second phase is displaced from a first position to a second position.

A method of the present disclosure can release electrical energy from the electrochemical cell to an external circuit. The method includes providing at least one electrochemical cell having three liquid phases. The first liquid phase defines a positive electrode and includes two elements other than an alkali metal. The second liquid phase includes cations of the alkali metal, and defines two separate interfaces. The first phase is in contact with the second phase at one of the interfaces. The third liquid phase defines a negative electrode and includes the alkali metal. It is separate from the first phase and in contact with the second phase at the other interface. The electrochemical cell is configured to connect sequentially with external circuits. The external circuits are electrically connected to a negative pole and a positive pole of electrochemical cell. The external circuits are sequentially operated to drive electrical energy to drive transfer of the alkali metal to or from the third liquid phase, through the second liquid phase, and to or from the first liquid phase, the first phase has a volume which increases or decreases while the third phase has a volume which decreases or increases respectively thus transferring energy to or from the electrochemical cell to or from the external circuits. As a result the second phase is displaced from a first position to a second position.

An electrochemical method and apparatus of the present disclosure for high-amperage electrical energy storage can feature a high-temperature, all-liquid chemistry. The reaction products created during charging can remain part of the electrodes during storage for discharge on demand. In a simultaneous ambipolar electrodeposition cell, a reaction compound can electrolyzed to effect transfer from an external power source The electrode elements are electrodissolved during discharge. Additional details of the liquid metal batteries can be found in U.S. Patent Publication No. 2008/0044725, which is herein incorporated by reference in its entirety.

Electrochemical cells of the present disclosure having molten electrodes comprising an alkaline earth metal can provide receipt and delivery of power by transporting atoms of the alkaline earth metal between electrode environments of disparate the alkaline earth metal chemical potentials. Additional details of the alkaline earth metal batteries can be found in U.S. Patent Publication No. 2011/0014503, which is herein incorporated by reference in its entirety.

In another aspect of the present disclosure, an energy storage device comprises at least one electrochemical cell having an operating temperature, the at least one electrochemical cell comprising: (a) a liquid negative electrode comprising a first metal; (b) a liquid electrolyte adjacent to the liquid negative electrode; and (c) a liquid positive electrode adjacent to the liquid electrolyte, the liquid positive electrode comprising a second elemental metal that is different than the first metal. The liquid electrolyte can comprise a charged species of the first metal and an oppositely charged species of the second metal, and the energy storage device is capable of being transported on a truck.

The first metal and/or the second metal can be an elemental metal (i.e., not an alloy or compound).

In another aspect of the present disclosure, an energy storage device comprises a first material and a second material, where the materials are liquid at the operating temperature of the device, the materials conduct electricity, the materials have different densities and the materials react with each other to form a mutual reaction compound, and the energy storage device is capable of being transported on a truck.

In some instances, the electrolyte has a free energy of formation more negative than that of the mutual reaction compound. In some embodiments, the electrolyte further comprises additives that lower the melting temperature of the electrolyte, reduces the viscosity of the electrolyte, enhance ionic conductivity through the electrolyte, inhibit electronic conductivity through the electrolyte or any combination thereof.

The first material or second material can further comprise additives that enable electrochemical monitoring of the extent of discharge of the device.

In another aspect of the present disclosure, an energy storage device comprises a molten salt, where a liquid electronic conductor is extracted from the molten salt by oxidation and metal is extracted from the molten salt by reduction and the energy storage device is capable of being transported on a truck.

In some cases, the liquid electronic conductor is antimony. In some embodiments, the liquid electronic metal is magnesium.

In another aspect of the present disclosure, an electrometallurgical cell comprises a positive electrode and a negative electrode, where the electrodes are liquid, the reactants of reactions that occur at the electrodes are liquid, and the products of reactions that occur at the electrodes are liquid, and where the electrometallurgical cell is capable of being transported on a truck.

In some cases, an electrode comprises a material and a reaction that occurs at the electrode produces the material, thereby enlarging the electrode. In some embodiments, an electrode comprises a material and a reaction that occurs at the electrode consumes the material, thereby consuming the electrode. In some embodiments, the electrodes do not comprise a solid.

The products of reactions that occur at the electrodes may not comprise a gas. In some embodiments, the cell has a current density of at least 100 $mA/cm^2$ and an efficiency of at least 60%, at least 70%, at least 80%, or at least 90%.

In another aspect of the present disclosure, an energy storage device capable of being transported on a truck and having a power capacity of greater than 1 MW comprises: (a) a physical footprint smaller than about 100 $m^2/MW$; (b) a cycle life greater than 3000 deep discharge cycles; (c) a lifespan of at least 10 years; (d) a DC-to-DC efficiency of at least 65%; (e) a discharge capacity of at most 10 hours; and (f) a response time of less than 100 milliseconds.

The energy storage device of the present disclosure may comprise a liquid metal. In some cases, the device comprises a liquid metal anode, a liquid metal cathode, and a liquid metal electrolyte. The device can be transported with some or all of the anode, cathode and electrolyte being in the solid state.

In another aspect of the present disclosure, an energy storage device comprises a liquid electrode, the electrode comprising an additive, where the electrode is consumed and the additive is concentrated by operation of the device, and where a property of the device is determined by of the concentration of the additive, and where the energy storage device is capable of being transported on a truck.

In some cases, the property of the device is the extent of discharge of the device. In some embodiments, the additive comprises lead. In some embodiments, the open voltage of the cell drops when the additive is concentrated.

In another aspect of the present disclosure, an energy storage device comprises a liquid antimony electrode, a steel container and a layer of iron antimonide disposed therebetween, where the device is operated at less than 738° C., and where the energy storage device is capable of being transported on a truck.

In some instances, the iron antimonide is electronically conductive and protects the steel from corrosion.

In another aspect of the present disclosure, an energy storage device comprises a liquid electrode and a current collector in contact with the electrode, where the liquid electrode is consumed in a reaction during operation of the device, and where the amount of liquid electrode is in stoichiometric excess relative to other reactants of the reaction such that the current collector is in contact with the liquid electrode when the reaction has proceeded to completion, and where the energy storage device is capable of being transported on a truck.

The current collector can be a negative current collector and the reaction comprises discharging the device.

In another aspect of the present disclosure, an energy storage device comprises an alkaline earth metal present in each of a positive electrode, a negative electrode and a liquid electrolyte, where the energy storage device is capable of being transported on a truck.

In some instances, the alkaline earth metal is at three disparate chemical potentials in the positive electrode, the negative electrode and the liquid electrolyte. In some cases, the alkaline earth metal is a halide in the electrolyte. In some instances, the alkaline earth metal is an alloy in the positive electrode. In some cases, the alkaline earth metal is elemental in the negative electrode.

In another aspect of the present disclosure, an energy storage device comprises an alkaline earth metal present in each of an elemental form, an alloy form and a halide form, where the energy storage device is capable of being transported on a truck.

In some cases, the elemental form (e.g., not alloyed or a salt) is found in a negative electrode of the device. In some embodiments, the alloy form is found in a positive electrode of the device. In some embodiments, the halide form (e.g., chloride salt) is found in an electrolyte of the device.

In another aspect of the present disclosure, an energy storage device comprises a liquid anode, a liquid cathode and a liquid electrolyte disposed therebetween, where the thickness of the electrolyte is substantially constant through a charge-discharge cycle of the device, and the energy storage device is capable of being transported on a truck. The thickness can vary by any suitable amount during the operation of the device including varying by less than 20%, less than 10%, less than 5%, or less than 2%.

In another aspect of the present disclosure, an energy storage device comprises a liquid anode, a liquid cathode and a liquid electrolyte disposed therebetween, where the thickness of the electrolyte is less than 50% of the thickness of the cathode or the anode, and the energy storage device is capable of being transported on a truck.

In another aspect of the present disclosure, an energy storage device comprises a liquid anode, a liquid cathode, a liquid electrolyte, and a circulation producer configured to generate circulation within at least one of the liquids, where the energy storage device is capable of being transported on a truck.

In some embodiments, the temperature inside the device is greater than the temperature outside the device and the circulation producer is a thermally conductive material extending from the inside of the device to the outside of the device.

In another aspect of the present disclosure, an energy storage device comprises a liquid electrode comprising an elemental alkaline earth metal and an electrolyte comprising a halide of the alkaline earth metal, where the electrolyte further comprises complexing ligands, and the energy storage device is capable of being transported on a truck.

The complexing ligands can reduce the solubility of the elemental alkaline earth metal in the halide of the alkaline earth metal.

In another aspect of the present disclosure, an energy storage device comprises a conductive housing comprising a conductive liquid anode, a conductive liquid cathode and an electrolyte disposed therebetween, where the interior surface of the container is not electrically insulated, and the energy storage device is capable of being transported on a truck.

In some cases, the device further comprises an electrically conductive structure that holds the conductive liquid anode or the conductive liquid cathode away from the interior surface of the container. In some cases, the conductive liquid anode or the conductive liquid cathode is associated with the structure at least in part by surface tension forces.

In another aspect of the present disclosure, an energy storage device comprises an anode comprising a first electronically conductive liquid and a cathode comprising a second electronically conductive liquid, where the device is configured to impede mixing of the electronically conductive liquids, and the energy storage device is capable of being transported on a truck.

In some instances, the electronically conductive liquids do not mix when the device is shaken or tipped. In some cases, the device further comprises an electrode separator disposed between the electronically conductive liquids. In some instances, the device further comprises a liquid electrolyte, the liquid electrolyte wets the electrode separator, and the electronically conductive liquids do not wet the separator. In some embodiments, the electrode separator floats in or on the electrolyte when the device is charged or discharged.

In another aspect of the present disclosure, an energy storage device comprises a negative electrode comprising an alkali metal, a positive electrode comprising the alkali metal and one or more additional elements and a liquid electrolyte disposed between the electrodes, where the electrolyte is not depleted upon charging or discharging of the device, and the energy storage device is capable of being transported on a truck.

At least one of the electrodes can be liquid at an operating temperature of the device. In some cases, the positive electrode comprises at least two additional elements such that the positive electrode comprises at least two elements when the positive electrode is fully depleted of the alkali metal. In some instances, the alkali metal is lithium, sodium, potassium, or any combination thereof.

In some cases, the one or more additional elements form an alloy with the alkali metal or exist in a compound with the alkali metal at an operating temperature of the device. In some embodiments, the one or more additional elements have a lower electronegativity than the alkali metal. In some instances, the electrolyte comprises a salt of the alkali metal. The operating temperature of the device is any suitable temperature such that the electrodes are molten (e.g., less than 600° C.).

In another aspect of the present disclosure, an energy storage device comprises a liquid metal electrode, a second metal electrode that can be a liquid and an electrolyte disposed between the electrodes, where the electrolyte is a paste, and the energy storage device is capable of being transported on a truck.

In another aspect of the present disclosure, an energy storage device comprises a liquid negative electrode comprising an alkali metal, a liquid positive electrode comprising an alloy of the alkali metal and an electrolyte disposed between the electrodes, where the electrolyte comprises a salt of the alkali metal and particles and the energy storage device is capable of being transported on a truck.

The particles can comprise alumina or magnesia. In some cases, the electrolyte is a paste.

In another aspect of the present disclosure, an energy storage device comprises a metal anode, a metal cathode and an electrolyte disposed between the electrodes, where the anode, cathode and electrolyte are liquids at an operating temperature of the device and the operating temperature of the device is less than 500° C., and the energy storage device is capable of being transported on a truck.

In some cases, the operating temperature of the device is less than 250° C.

In another aspect of the present disclosure, a method for charging an energy storage device comprises connecting an external charging circuit to terminals of the energy storage device that is capable of being transported on a truck such that an active alkali metal moves from a positive electrode, through an electrolyte, to a negative electrode comprising a metal having a higher chemical potential than the positive electrode.

In some instances, the active alkali metal is lithium, sodium, potassium, or any combination thereof.

In another aspect of the present disclosure, a method for discharging an energy storage device comprises connecting an external load to terminals of the energy storage device that is capable of being transported on a truck such that an active alkali metal moves from a negative electrode, through an electrolyte as cations, to a positive electrode where the active alkali metal forms a neutral metal having a lower chemical potential than the negative electrode.

In some cases, the active alkali metal is lithium, sodium, potassium, or any combination thereof.

In another aspect of the present disclosure, an energy storage device comprises a liquid metal electrode, an electrolyte and a current collector in contact with the electrode, where the current collector comprises a material that has a higher wetability with the liquid metal than with the electrolyte. In some embodiments, the material is a foam.

Energy storage devices of the present disclosure may be used in grid-scale settings or stand-alone settings. Energy storage device of the disclosure can, in some cases, be used to power vehicles, such as scooters, motorcycles, cars, trucks, trains, helicopters, airplanes, and other mechanical devices, such as robots.

Systems, apparatuses and methods of the disclosure may be combined with or modified by other systems, apparatuses and/or methods, such as batteries and battery components described, for example, in U.S. Pat. No. 3,663,295 ("STORAGE BATTERY ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), U.S. Patent Publication No. 2012/0104990 ("ALKALI METAL ION BATTERY WITH BIMETALLIC ELECTRODE"), and U.S. patent application Ser. No. 13/801,333 ("ELECTROCHEMICAL ENERGY STORAGE DEVICES"), filed on Mar. 13, 2013, which are entirely incorporated herein by reference.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. An energy storage system comprising:
a container comprising one or more energy storage cells, wherein an energy storage cell of said one or more energy storage cells comprises a negative electrode, a positive electrode and an electrolyte disposed between said negative electrode and said positive electrode, wherein said one or more energy storage cells are configured to undergo sustained self-heating during a charge-discharge cycle, wherein said energy storage cell has a surface area-to-volume ratio of less than or equal to about 100 $m^{-1}$, and wherein, at an operating temperature of said one or more energy storage cells, at least two of said positive electrode, said electrolyte, and said negative electrode are in a liquid state.

2. The energy storage system of claim 1, further comprising a control system comprising a computer processor that is programmed to monitor said operating temperature of said one or more energy storage cells or said container during said sustained self-heating.

3. The energy storage system of claim 2, wherein said control system is further configured to regulate flow of electrical energy into or from at least a subset of said one or more energy storage cells.

4. The energy storage system of claim 1, wherein said operating temperature is at least about 200° C.

5. The energy storage system of claim 4, wherein said operating temperature is at least 250° C.

6. The energy storage system of claim 1, wherein at said operating temperature, said electrolyte is in a liquid state.

7. The energy storage system of claim 1, wherein at said operating temperature, said positive electrode, said electrolyte, and said negative electrode are in a liquid state.

8. The energy storage system of claim 1, wherein said energy storage system has an energy storage capacity of at least about 1 kilowatt-hour (kWh).

9. The energy storage system of claim 8, wherein said energy storage capacity is greater than or equal to about 1 megawatt-hour (MWh).

10. The energy storage system of claim 1, wherein said negative electrode comprises one or more materials selected from the group consisting of lithium, sodium, potassium, magnesium, and calcium.

11. The energy storage system of claim 1, wherein said positive electrode comprises one or more materials selected from the group consisting of lead, antimony, tin, tellurium, and bismuth.

12. The energy storage system of claim 1, wherein a response time of said energy storage system is less than or equal to about 100 milliseconds (ms).

13. The energy storage system of claim 1, wherein said energy storage system has a power capacity of greater than 1 megawatt (MW).

14. The energy storage system of claim 1, wherein said energy storage system is capable of being transported on a vehicle.

15. The energy storage system of claim 1, wherein said energy storage system has an efficiency of at least about 60%.

16. The energy storage system of claim 1, wherein said energy storage system has a current density of at least about 10 milliamps per square centimeter (mA/cm$^2$).

17. The energy storage system of claim 1, wherein said one or more energy storage cells are configured to undergo sustained self-heating with substantially no overpotentials.

* * * * *